United States Patent
Shim et al.

(10) Patent No.: US 11,975,528 B2
(45) Date of Patent: May 7, 2024

(54) COVER GLASS PRINTING PAD, METHOD OF MANUFACTURING COVER GLASS USING THE SAME AND COVER GLASS MANUFACTURED BY THE SAME

(71) Applicant: Samsung Display Co., Ltd., Yongin-si (KR)

(72) Inventors: Byoung Yul Shim, Hwaseong-si (KR); Jong Kap Jo, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 544 days.

(21) Appl. No.: 16/735,646

(22) Filed: Jan. 6, 2020

(65) Prior Publication Data

US 2020/0262194 A1     Aug. 20, 2020

(30) Foreign Application Priority Data

Feb. 18, 2019  (KR) .................. 10-2019-0018685

(51) Int. Cl.
   *B41F 17/00*   (2006.01)
   *H04M 1/02*    (2006.01)

(52) U.S. Cl.
   CPC .......... *B41F 17/001* (2013.01); *H04M 1/0266* (2013.01)

(58) Field of Classification Search
   CPC ...... B41F 16/008; B41F 17/001; B41F 17/30; B41M 1/34; B41M 5/025; B41M 1/40; B41M 7/00; C03C 17/00; C03C 2218/119; H04M 1/0266
   See application file for complete search history.

(56) References Cited

U.S. PATENT DOCUMENTS

| | | | |
|---|---|---|---|
| 10,293,596 B2* | 5/2019 | Vogt | B41F 17/001 |
| 10,678,081 B2 | 6/2020 | Inoue et al. | |
| 10,894,438 B2 | 1/2021 | Muraoka | |
| 2012/0222574 A1* | 9/2012 | Inoue | B41M 1/40 |
| | | | 101/368 |

FOREIGN PATENT DOCUMENTS

| | | |
|---|---|---|
| CN | 102738568 A | 10/2012 |
| CN | 203449739 | 2/2014 |
| CN | 106696450 A | 5/2017 |
| CN | 106945446 A | 7/2017 |

(Continued)

OTHER PUBLICATIONS

Chinese Office Action—Application No. CN202010090846.4 dated Nov. 25, 2022, citing references listed within.

(Continued)

*Primary Examiner* — Christopher E Mahoney
*Assistant Examiner* — Marissa Ferguson-Samreth
(74) *Attorney, Agent, or Firm* — CANTOR COLBURN LLP

(57) ABSTRACT

A cover glass printing pad, a method of manufacturing the cover glass and the cover glass are provided. The cover glass printing pad includes a jig portion, a body portion in which a first surface contacts the jig portion and at least a part of a second surface is parallel to the first surface and a pad portion including an outer frame portion disposed on at least one side of the body portion and protruding in a first direction perpendicular to the second surface.

6 Claims, 25 Drawing Sheets

(56) References Cited

FOREIGN PATENT DOCUMENTS

| | | | | |
|---|---|---|---|---|
| CN | 107921809 | | 4/2018 | |
| CN | 109219842 | | 1/2019 | |
| CN | 113733731 A | * | 12/2021 | |
| CN | 114248573 A | * | 3/2022 | ............. B32B 37/10 |
| FR | 2873051 A1 | * | 1/2006 | ......... B24B 13/0055 |
| JP | 2013198996 | | 10/2013 | |
| JP | 2016006573 | | 1/2016 | |
| JP | 2016-210056 | * | 12/2016 | |
| JP | 2017213881 A | * | 12/2017 | ....... B32B 17/10458 |
| KR | 20070041557 A | | 4/2007 | |
| KR | 101373142 | | 3/2014 | |
| KR | 101866965 B1 | * | 6/2018 | |
| KR | 101898041 B1 | | 9/2018 | |
| KR | 102211081 B1 | * | 2/2021 | |
| KR | 20210085676 A | * | 7/2021 | |
| WO | 2018/0252299 | * | 2/2018 | |

OTHER PUBLICATIONS

Notice of Allowance—Korean Application No. 10-2019-0018685 dated Feb. 26, 2024, citing references listed within.

\* cited by examiner

COVER GLASS PRINTING PAD, METHOD OF MANUFACTURING COVER GLASS USING THE SAME AND COVER GLASS MANUFACTURED BY THE SAME

This application claims priority to Korean Patent Application No. 10-2019-0018685, filed on Feb. 18, 2019, and all the benefits accruing therefrom under 35 U.S.C. § 119, the content of which in its entirety is herein incorporated by reference.

BACKGROUND

1. Field

Exemplary embodiments of the invention relate to a cover glass printing pad, a method of manufacturing a cover glass using the printing pad, and a cover glass manufactured by the method. More particularly, exemplary embodiments of the invention relate to a cover glass printing pad capable of being selectively printed on at least partially inclined or rounded area of a cover glass.

2. Description of the Related Art

An importance of a display device has increased with a development of multimedia. Accordingly, various types of display devices such as an organic light emitting display ("OLED") and a liquid crystal display ("LCD") have been used. Such display devices may be used for various mobile electronic appliances such as smart phones, smart watches, and tablet personal computers ("PCs").

In various display devices used for mobile electronic appliances, a cover glass is generally manufactured to be transparent such that a user can see a display unit is disposed in front of a display panel. The display panel may include a display area where an actual image is displayed and a non-display area other than the display area. The cover glass may include a light transmitting area corresponding to the display area of the display panel and an opaque light blocking area corresponding to the non-display area of the display panel. In the opaque light blocking area, a light blocking member for partially blocking light emitted from the display panel may be provided, or predetermined ink may be printed.

Recently, the importance of a display device having a partially inclined or rounded display surface has increased. A surface of a front cover glass forming an outer appearance of the display device may be partially rounded to improve an esthetic feeling of the display device and a gripping feeling of a user, for example.

SUMMARY

In a case of a cover glass having a partially inclined or rounded area, a part of a light blocking area is inclined or rounded, and thus the area may be provided with a light blocking member or may be printed with predetermined ink. In an exemplary embodiment, predetermined ink may be printed on a cover glass by a pad printing method to form a light blocking area. In this case, when using a conventional semispherical pad, there is a problem that ink is not easily printed due to poor pad contact in the inclined or rounded area.

An exemplary embodiment of the invention is to provide a cover glass printing pad for printing a light blocking ink on a partially inclined or rounded cover glass, and a method of manufacturing a cover glass using the cover glass printing pad.

Another exemplary embodiment of the invention is to provide a cover glass on which a light blocking ink is easily printed on a partially inclined or rounded region of the cover glass.

However, exemplary embodiments of the invention are not restricted to the one set forth herein. The above and other exemplary embodiments of the invention will become more apparent to one of ordinary skill in the art to which the invention pertains by referencing the detailed description of the invention given below.

In an exemplary embodiment of the discloser, a cover glass printing pad includes a jig portion, a body portion in which a first surface contacts the jig portion and at least a part of a second surface is parallel to the first surface and a pad portion including an outer frame portion disposed on at least one side of the body portion and protruding in a first direction perpendicular to the second surface.

In an exemplary embodiment, the body portion includes a first side extending in a second direction perpendicular to the first direction and a second side extending in a third direction perpendicular to the first direction and crossing the second direction.

In an exemplary embodiment, the outer frame portion include a first outer frame portion in which a region adjacent to the first side protrudes in the first direction.

In an exemplary embodiment, at least a part of one end of the first outer frame portion, protruding in the first direction, has an inclined shape.

In an exemplary embodiment, in the one end of the first outer frame portion, an outer surface protruding in the first direction has a rounded shape.

In an exemplary embodiment, the first outer frame portion has a shape in which both sides surfaces are inclined.

In an exemplary embodiment, the outer frame portion further include a second outer frame portion in which a region adjacent to the second side protrudes in the first direction, and a length of the first outer frame portion, measured in the second direction, is longer than a length of the second outer frame portion, measured in the third direction.

In an exemplary embodiment, the first outer frame portion and the second outer frame portion are unitary with each other.

In an exemplary embodiment of the discloser, a method of manufacturing a cover glass includes providing a base member including a first area, a surface of which is parallel to a first direction, and a second area adjacent to the first area and not parallel to the first direction and forming a first light blocking layer disposed on at least a part of the first area adjacent to the second area and a third light blocking layer disposed on at least a part of the second area and partially contacting one end of the first light blocking layer.

In an exemplary embodiment, the forming the first light blocking layer includes bringing a first pad contacting the first area into contact with at least a part of the first area and transferring a first light blocking ink to a contact area and drying the first light blocking ink.

In an exemplary embodiment, the forming the second light blocking layer includes bringing a second pad contacting the second area into contact with at least a part of the second area and transferring a second light blocking ink to the contact area and drying the second light blocking ink.

In an exemplary embodiment, the second pad includes a jig portion, a body portion in which a first surface contacts the jig portion and at least a part of the second surface is parallel to the first surface, and a pad portion including an outer frame portion disposed on at least one side of the body portion and protruding in a first direction perpendicular to the second surface, and a contact area between one protruding end of the outer frame portion and the base member includes at least the second area.

In an exemplary embodiment, the drying of the second light blocking ink is performed at a temperature of about 150 degrees Celsius (° C.) to about 180° C., and the drying of the first light blocking ink is performed at a temperature of about 60° C. to about 80° C.

In an exemplary embodiment, a third light blocking layer disposed on the first light blocking layer and recessed inward from both ends of the first light blocking layer is further disposed.

In an exemplary embodiment, the forming of the third light blocking layer includes, after the forming of the first light blocking layer transferring a third light blocking ink onto the first light blocking layer using the first pad and drying the third light blocking ink.

In an exemplary embodiment, the first light blocking layer is disposed on the first area after the second light blocking layer is disposed.

In an exemplary embodiment of the discloser, a cover glass includes a base member including a first area, one surface of which is parallel to a first direction, and a second area adjacent to the first area and not parallel to the first direction, a first light blocking layer disposed on at least a part of the first area adjacent to the second area and a second light blocking layer disposed on at least a part of the second area and partially contacting one end of the first light blocking.

In an exemplary embodiment, a width of the first light blocking layer is larger than a width of the second light blocking layer.

In an exemplary embodiment, a third light blocking layer disposed on at least a part of the first light blocking layer, where both ends of the first light blocking layer protrude from both ends of the third light blocking layer.

In an exemplary embodiment, the first light blocking layer, the second light blocking layer, and the third light blocking layer are arranged to extend in a second direction crossing the first direction.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1:
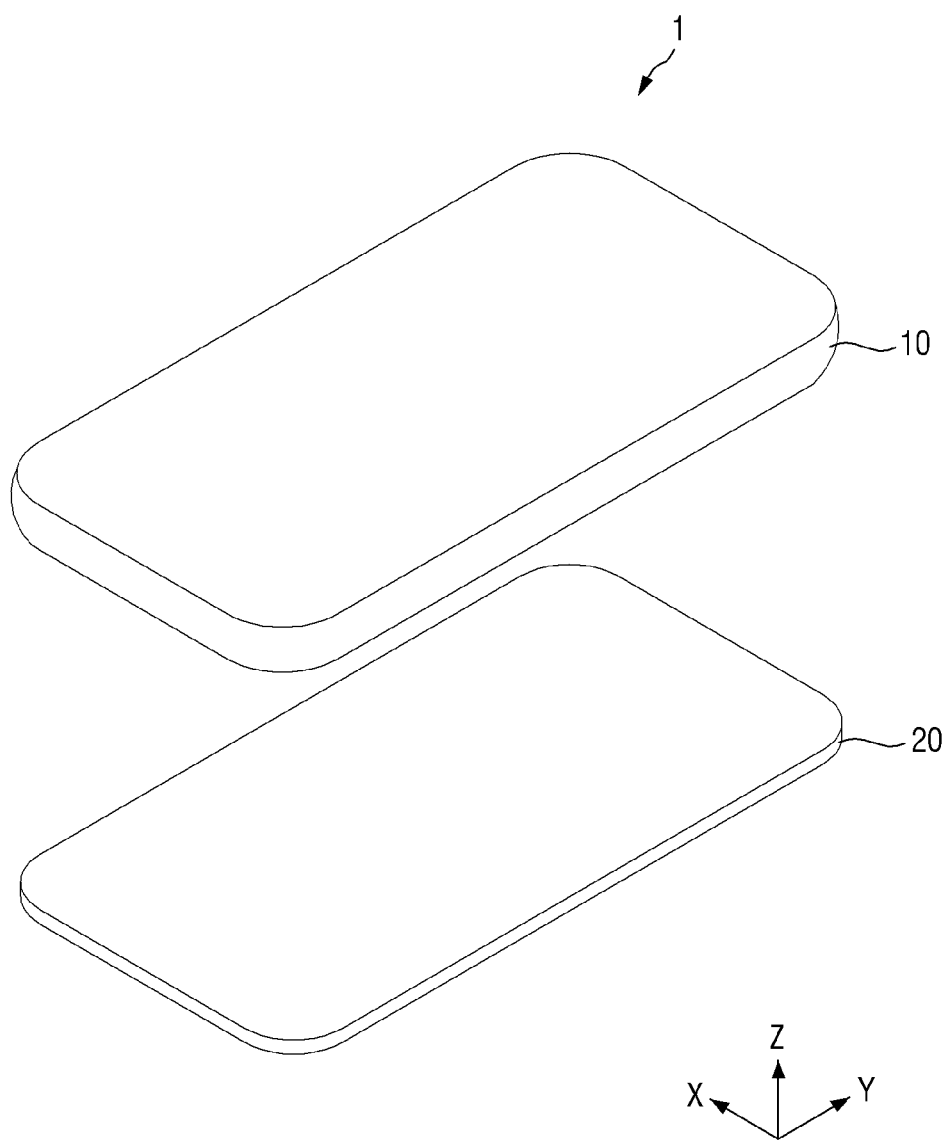
FIG. 1 is an exploded perspective view of an exemplary embodiment of a display device including a cover glass.

The invention will now be described more fully hereinafter with reference to the accompanying drawings, in which preferred embodiments of the invention are shown. This invention may, however, be embodied in different forms and should not be construed as limited to the exemplary embodiments set forth herein. Rather, these embodiments are provided so that this invention will be thorough and complete, and will filly convey the scope of the invention to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the invention. Similarly, the second element could also be termed the first element.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/ or "including" when used in this specification, specify the presence of stated features, regions, integers, steps, operations, elements, and/or components, but do not preclude the presence or addition of one or more other features, regions, integers, steps, operations, elements, components, and/or groups thereof.

In this specification, the "on", "over", "top", "upper side", or "upper surface" refers to a Z-axis direction, and the "beneath", "under", "bottom", "lower side", or "lower surface" refers to a direction opposite to the Z-axis direction. Further, the "left", "right", "upper", and "lower" refer to directions when the display panel 10 is viewed from the plane. For example, the "left" refers to a direction opposite to the X-axis direction, the "right" refers to the X-axis direction, the "upper" refers to the Y-axis direction, and the "lower" refers to a direction opposite to the Y-axis direction.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described with reference to the attached drawings.

FIG. 1 is an exploded perspective view of an exemplary embodiment of a display device including a cover glass.

A display device 1 in an exemplary embodiment may include a display member 20 and a cover glass 10. Although it is shown in FIG. 1 that the display device 1 includes a display member 20 and a cover glass 10 entirely covering the display member 20, the invention is not limited thereto. In some cases, the display device 1 may further include other members such as a touch member and an adhesive member. Hereinafter, the display device 1 including the display member 20 and the cover glass 10 will be described.

Referring to FIG. 1, the display member 20 may be a member for displaying information or an image by an inputted data signal. In an exemplary embodiment, as the display member 20, an organic light emitting display panel, an inorganic light emitting display, panel, a liquid crystal display panel, a plasma display panel, or an electrophoretic display panel may be applied, for example. However, the invention is not limited thereto.

The display member 20 may have a rectangular shape in a plan view. In an exemplary embodiment, the display member 20 may have a rectangular planar shape having short sides in the first direction (X-axis direction) and long sides in the second direction (Y-axis direction) as shown in FIG. 1, for example. The corner where the short side in the first direction (X-axis direction) meets the long side in the second direction (Y-axis direction) may have a right angle shape or have a round shape of a predetermined curvature. However, the planar shape of the display member 20 is not limited to a rectangular shape, and may be provided in other various shapes such as polygonal shape, circular shape, or elliptical shape. Further, although it is illustrated in FIG. 1 that the display member 20 is flat, the invention is not limited thereto. At least one side of the display member 20 may be bent at a predetermined curvature.

The cover glass 10 may be disposed on one surface of the display member 20 in the third direction (Z-axis direction), for example, the upper surface of the display member 20. The cover glass 10 may cover the display member 20 of the display device 1 to protect the display member 20. In an exemplary embodiment, the cover glass 10 may have substantially the same shape as that of the display member 20, and may have a larger size than that of the display member 20 so as to entirely cover one surface of the display member 20, for example. That is, each side of the cover glass 10 may protrude from each side of the display member 20, but the invention is not limited thereto. Details of the cover glass 10 will be described in detail with reference to FIGS. 2 and 3.

Figure 2:
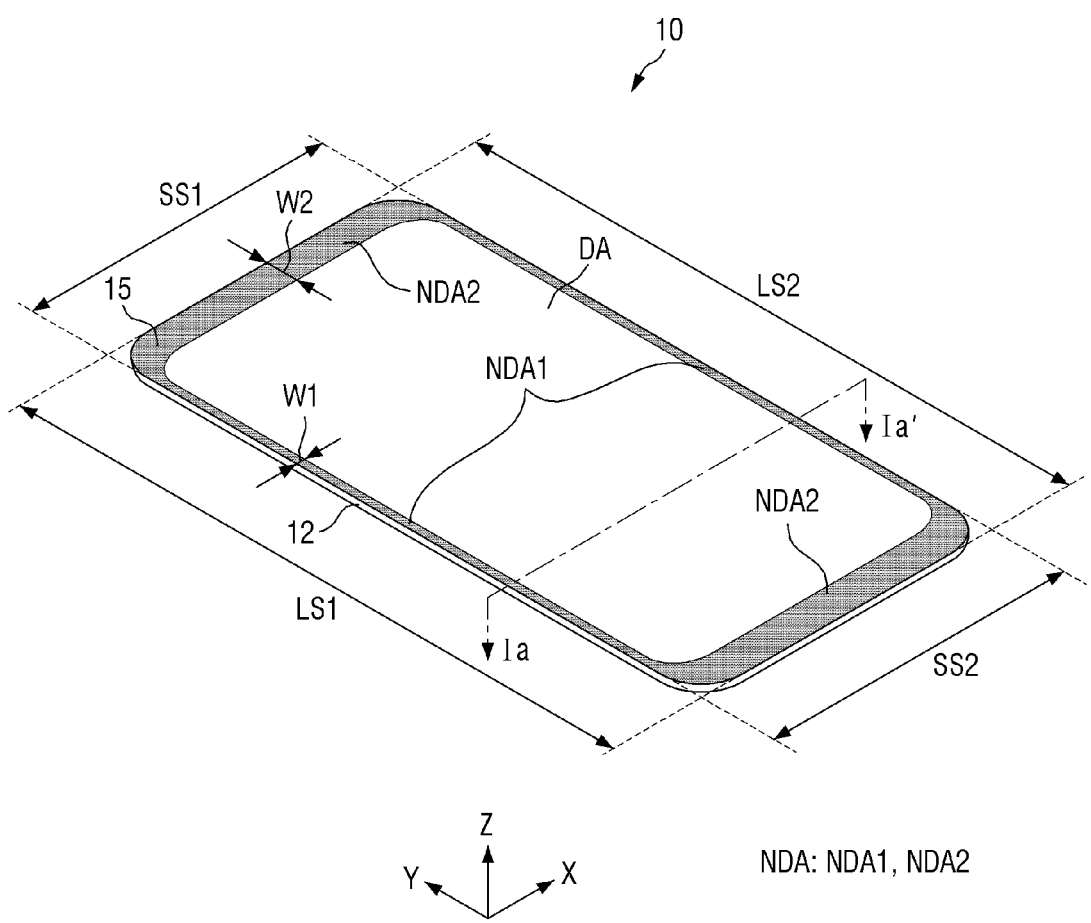
FIG. 2 is a schematic view illustrating an exemplary embodiment of a cover glass.
Figure 3:
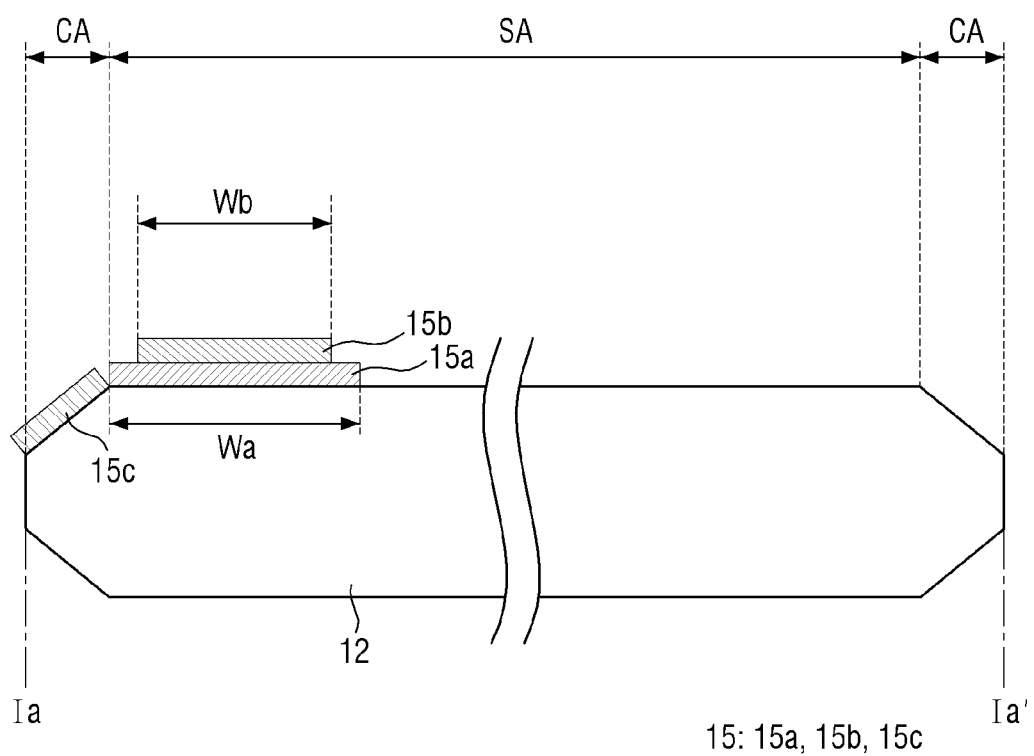
FIG. 3 is a cross-sectional view taken along line Ia-Ia' of FIG. 2.

FIG. 2 is a schematic view illustrating an exemplary embodiment of a cover glass. FIG. 3 is a cross-sectional view taken along line Ia-Ia' of FIG. 2.

Referring to FIGS. 1 to 3, the cover glass 10 may include a base member 12 and a light blocking member 15 disposed on at least a part of the base member 12.

The base member 12 may be a substrate constituting the basic skeleton of the cover glass 10. The base member 12 may include a transparent material such that a series of information displayed on the display member 20 may be displayed. In an exemplary embodiment, the base member 12 may include glass or plastic, for example. When the base member 12 of the cover glass 10 includes a plastic material, the cover glass may have flexible properties.

Examples of the plastics applicable to the base member 12 may include, but are not limited to, polyimide, polyacrylate, polymethylmethacrylate ("PMMA"), polycarbonate ("PC"), polyethylenenaphthalate ("PEN"), polyvinylidene chloride, polyvinylidene difluoride ("PVDF"), polystyrene, an ethylene vinyl alcohol copolymer, polyethersulphone ("PES"), polyetherimide ("PEI"), polyphenylene sulfide ("PPS"), polyallylate, tri-acetyl cellulose ("TAC"), and cellulose acetate propionate ("CAP").

When the base member 12 includes plastic, the base member 12 may further include a coating layer (not shown) disposed on the upper and lower surfaces thereof. The coating layer may be a hard coating layer including an organic layer and/or an organic-inorganic composite layer, each including an acrylate compound. The organic layer may include an acrylate compound. The organic-inorganic composite layer may be a layer in which an inorganic material such as silicon oxide, zirconium oxide, aluminum oxide, tantalum oxide, niobium oxide or glass beads is dispersed in an organic material such as an acrylate compound. In another exemplary embodiment, the coating layer may include a metal oxide layer. In an exemplary embodiment, the metal oxide layer may include a metal oxide of titanium, aluminum, molybdenum, tantalum, copper, indium, tin, or tungsten, for example, but the invention is not limited thereto.

The base member 12 has substantially the same shape as that of the cover glass 10, and other members disposed on the base member 12 may constitute one cover glass 10 together with the base member 12. That is, the shape of the base member 12 is not particularly limited as long as it may cover the entire display member 20 as described above. In an exemplary embodiment, the base member 12 may have a rectangular shape in a plan view, for example. Specifically, the base member 12 may have a rectangular shape including corners which are vertical in a plan view, or may have a rectangular shape including corners which are round in a plan view.

In this case, the base member 12 may include long sides LS1 and LS2 facing in parallel to each other and extending in the second direction (Y-axis direction) and short sides SS1 and SS2 facing in parallel to each other and extending in the first direction (X-axis direction). For convenience of explanation, in the drawings, in a plan view, the left long side is referred to as the first long side LS1, the right long side is referred to as the second long side LS2, the upper short side is referred to as the first short side SS1, and the lower short side is referred to as the second short side SS2. In an exemplary embodiment, the length of each of the long sides LS1 and LS2 may be longer than the length of each of the short sides SS1 and SS2, and the length of each of the long sides LS1 and LS2 may be about 1.5 times to about 2.5 times the length of each of the short sides SS1 and SS2. However, the invention is not limited thereto.

As shown in the drawing, the base member 12 may have a shape in which one surface is flat in a cross-sectional view, and each outer side is not rounded. However, the invention is not limited thereto, and in some cases, the base member 12 may have a shape in which each outer side is rounded with a predetermined curvature, or may have an entirely rounded shape. Details thereof will be described later with reference to other exemplary embodiments.

The light blocking member 15 may be disposed on at least a part of one surface of the base member 12 in the third direction (Z-axis direction), for example, at least a part of the lower surface of the base member 12 which is one surface facing the display member 20. The light blocking member 15 may include a material absorbing or blocking the light emitted from the display member 20 to block the light incident toward the light blocking member 15.

Accordingly, the cover glass 10 may include a light blocking area NDA which is an area where the light blocking member 15 is disposed and a display area DA which is an area other than the light blocking area NDA, on the base member 12. That is, when the light blocking member 15 is disposed on the base member 12, the light blocking area NDA of the cover glass 10 is defined, and the light emitted from the display member 20 may be displayed on the display area DA of the display device 1.

In an exemplary embodiment, the light blocking member 15 may be disposed along the outer periphery of the base member 12, and thus the light blocking area NDA may be disposed to surround the display area DA. The light blocking member 15 may be disposed along both long sides LS1 and LS2 and both short sides SS1 and SS2 of the base member 12, and the light blocking area NDA may include a first light blocking area NDA1 disposed adjacent to the both long sides LS1 and LS2 and a second light blocking area NDA2 disposed adjacent to the both short sides SS1 and SS2.

The first light blocking area NDA1 may be disposed on both side surfaces of the cover glass 10 in the first direction (X-axis direction), that is, on the left and right side surfaces of the cover glass 10, and the second light blocking area NDA2 may be disposed on both side surfaces of the cover glass 10 in the second direction (Y-axis direction), that is, on the upper and lower side surfaces of the cover glass 10. In an exemplary embodiment, each of the first light blocking area NDA1 and the second light blocking area NDA2 may be provided with a predetermined width, and the width W2 of the second light blocking area NDA2 may be wider than the width W1 of the first light blocking area NDA1, for example.

Since the first light blocking area NDA1 is provided with a relatively narrow width W1, the area of the display area DA of the cover glass 10 increases, thereby allowing more images to be simultaneously transmitted from the display device 1. Since the second light blocking area NDA2 is provided with a relatively wide width W2, a space in which other members, for example, a speaker and a camera, included in the display device 1, is secured, or a logo or pattern is printed, so that the aesthetic feeling of the display device 1 may be improved. However, the invention is not limited thereto, and in some cases, at least a part of the second light blocking area NDA2 is concavely provided, and thus the second light blocking area NDA2 may partially have a narrower width.

In an exemplary embodiment, the first light blocking area NDA1 adjacent to both the long sides LS1 and LS2 of the base member 12 is longer in one direction than the second light blocking area NDA2 adjacent to both short sides SS1 and SS2 of the base member 12. As described above, the cover glass 10 includes respective sides having different lengths, and the first light blocking area NDA1 and the second light blocking area NDA2 disposed adjacent to the respective sides may have different lengths and extend in different directions.

The light blocking area NDA may have various shapes as the light blocking member 15 is disposed on the base member 12. In an exemplary embodiment, the light blocking member 15 may be provided by printing a predetermined ink on the base member 12. In an exemplary embodiment, the ink includes a material that absorbs light or blocks the transmission of light, and a pad printing method may be used as the method of printing the ink on the base member 12, for example. The pad printing method is a method of printing an ink in which the ink is transferred to a target object by the contact between the target object and the pad. The ink transferred to the pad may be printed on the target object depending on the surface energy between the pad and the ink and between the target object and the ink in the area in which the pad contacts the target object.

Here, the shape of the pad for printing or transferring the ink may be changed depending on the shape of the target object, for example, the base member 12 of the cover glass 10. The shape of the pad may be changed depending on the both long sides LS1 and LS2 and both short sides SS1 and SS2 of the base member 12, having different lengths. Further, the shape of the pad may also be changed depending on whether or not one surface of the base member 12 on which the light blocking member 15 is disposed is flat. Details thereof will be described later.

The line Ia-Ia' in FIG. 2 is a line crossing both long sides LS1 and LS2 of the base member 12, and FIG. 3 may be understood to show a cross section including the first light blocking area NDA1 of the cover glass 10. It is shown in FIG. 3 that the light blocking member 15 is disposed on the base member 12, which may be understood that the lower surface of the cover glass 10 of FIG. 2 is turned over toward the upper side of FIG. 3.

Explaining the light blocking member 15 in detail with reference to FIGS. 2 and 3, the light blocking member 15 in an exemplary embodiment may include a first light blocking layer 15a, a second light blocking layer 15b, and a third light blocking layer 15c.

One surface of the base member 12 includes a flat area SA that is horizontal in the first direction (X-axis direction) and a chamfer area CA that is not flat but sloped or rounded unlike the flat area SA. The chamfer area CA may surround the flat area SA at the outer side of the base member 12, and the cover glass 10 may be substantially flat at the central portion of one surface, and each outer side may have a partially inclined or rounded shape.

The light blocking member 15 may be disposed on the chamfer area CA and a part of the flat area SA. In an exemplary embodiment, the third light blocking layer 15c may be disposed on the chamfer area CA, and the first light blocking layer 15a and the second light blocking layer 15b may be disposed on the flat area SA, for example. Thus, the light blocking area NDA of the cover glass 10 may overlap the chamfer area CA of the base member 12 and at least a part of the flat area SA of the base member 12.

The first light blocking layer 15a and the second light blocking layer 15b may be disposed on the flat area SA, but may be disposed adjacent to a boundary with the chamfer area CA, that is, adjacent to the outer side of the base member 12. The first light blocking layer 15a may be disposed to directly contact the base member 12, and the second light blocking layer 15b may be disposed on the first light blocking layer 15a. In an exemplary embodiment, the width Wb of the second light blocking layer 15b may be shorter than the width Wa of the first light blocking layer 15a. That is, both sides of the first light blocking layer 15a may be disposed to protrude from both sides of the second light blocking layer 15b. The first light blocking layer 15a and the second light blocking layer 15b, which are disposed on the flat area SA of the base member 12, may partially overlap each other, and may constitute a flat portion of the light blocking area NDA.

The third light blocking layer 15c may be disposed on the chamfer area CA, and may be disposed on the outermost portion of the base member 12 in the plan view. The third light blocking layer 15c may be disposed to be in direct contact with the chamfer area CA of the base member 12, and may block the transmission of light emitted from the display member 20 and then incident on the chamfer area CA of the base member 12. When the light blocking member 15 includes only the first light blocking layer 15a and the second light blocking layer 15b disposed on the flat area SA of the base member 12, there may occur a problem that a small amount of light is emitted from the outermost portion of the display device 1 through the chamfer area CA of the base member 12. In order to solve the above problem, the cover glass 10 in an exemplary embodiment includes the third light blocking layer 15c disposed on the chamfer area CA of the base member 12, and thus the light leakage phenomenon of the display device 1 may be prevented.

The structure of the light blocking member 15 may be provided by a first process of forming the first light blocking layer 15a and the second light blocking layer 15b and a process of forming the third light blocking layer 15c at the time of manufacturing the cover glass 10.

In an exemplary embodiment, when forming the light blocking member 15 through a pad printing method, the pads of the same shape may be in contact with the flat area SA and chamfer area CA of the base member 12 with different pressures, respectively, for example. In this case, the ink transferred to the flat area SA may be printed smoothly with the base member 12, but the ink may not be printed on the chamfer area CA or the adhesion between the ink and the base member 12 may be weak to be vulnerable to external impact.

In an exemplary embodiment, at the time of manufacturing the cover glass 10, the third light blocking layer 15c may be selectively disposed on the chamfer area CA by performing the second process of forming the third light blocking layer 15c using the second pad having a different shape from that of the first pad in the process of forming the first light blocking layer 15a and the second light blocking layer 15b. Accordingly, the third light blocking layer 15c may be provided with high pressure in the chamfer area CA of the base member 12, and the adhesion between the third light blocking layer 15c and the base member 12 may be improved.

Hereinafter, an exemplary embodiment of a pad printing apparatus for manufacturing the cover glass 10, and a method of manufacturing the cover glass 10 using the apparatus will be described.

Figure 4:
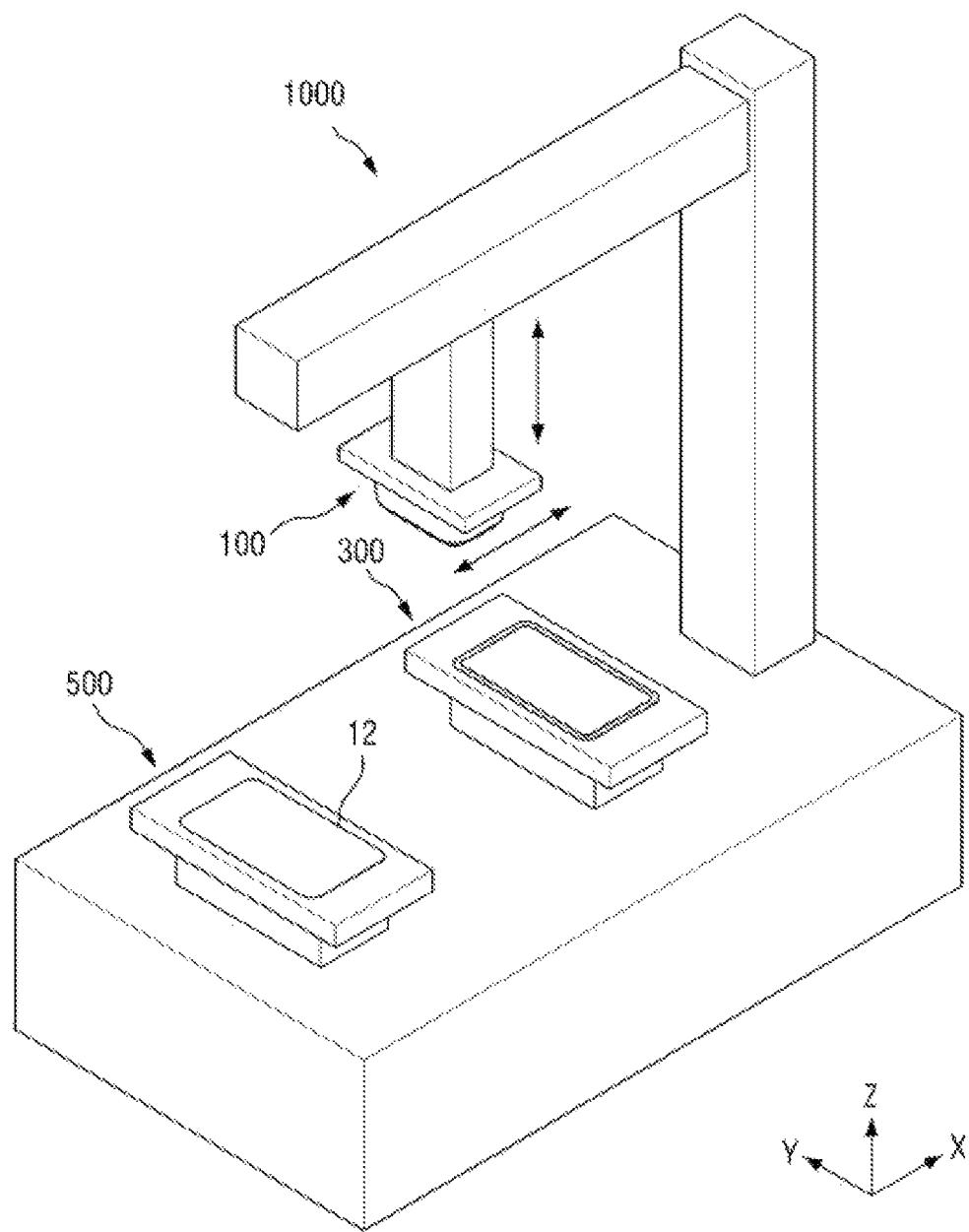
FIG. 4 is a schematic perspective view illustrating an exemplary embodiment of a pad printing apparatus including a printing pad.

FIG. 4 is a schematic perspective view illustrating an exemplary embodiment of a pad printing apparatus including a printing pad.

Referring to FIG. 4, an exemplary embodiment of a pad printing apparatus 1000 for manufacturing the cover glass 10 may include a printing pad 100, an ink supplier 300, and a stage 500.

The stage 500 may provide a space for providing a target object on which a predetermined ink is printed through the pad printing apparatus 1000. In an exemplary embodiment, the stage 500 may have a flat upper surface, but the invention is not limited thereto, for example. The shape of the stage 500 is not limited as long as the stage 500 may fix the target object not to move the target object when the printing pad 100 contacts the target object. In some cases, the stage 500 may include members spaced apart from each other to fix the target object between the members. It is shown in the drawings that the stage 500 is a substrate having a flat upper surface, and a target object on which an ink is to be printed, that is, the base member 12 or the cover glass 10 is provided on the substrate. The pad printing apparatus 1000 in an exemplary embodiment is an apparatus for manufacturing the cover glass 10 shown in FIGS. 1 to 3, and the ink supplier 300 and the printing pad 100, which will be described later, may also have a structure and function for manufacturing the cover glass 10 shown in FIGS. 1 to 3. However, the invention is not limited thereto.

The ink supplier 300 is spaced apart from the stage 500 in the second direction (Y-axis direction), and supplies an ink to be printed or transferred to a target object. The ink supplied from the ink supplier 300 may be brought into contact with the printing pad to be described later to be transferred to the printing pad 100 and printed or transferred to the target object from the printing pad 100. The ink may be transferred or printed to any one member by surface energy among other members. In an exemplary embodiment, the printing pad 100 and the ink supplier 300 are brought into contact with each other, and the printing pad 100 and the target object are brought into contact with each other, for example, so that the ink may be printed or transferred to the target object from the ink supplier 300 through the printing pad 100.

The ink supplier 300 may have a predetermined pattern in accordance with the shape in which the ink is printed or transferred to the target object. In an exemplary embodiment, at the time of manufacturing the cover glass 10, in order to form the light blocking area NDA only on the outer periphery of the cover glass 10, the ink supplier 300 may include a pattern having the same shape as that of the light blocking area NDA, for example. The ink supplier 300 may supply an ink through the pattern, and may not supply the ink to an area where no pattern is provided. Thus, even when the printing pad 100 is brought into contact with the pattern of the ink supplier 300 and other areas, the ink may be transferred only to the area where the printing pad 100 is in contact with the pattern.

The printing pad 100 may transfer or print the ink transferred from the ink supplier 300 onto the target object.

The printing pad 100 may perform an operation of bringing the target object provided on the stage 300 into direct contact with the ink supplier 300, thereby printing the ink on the target object. The printing pad 100 may be spaced apart from the ink supplier 300 and the stage 500 upward to perform an operation of moving in a specific direction.

Specifically, the printing pad 100 may be engaged with a movable shaft (not shown), and the shaft may perform an operation of moving in the third direction (Z-axis direction) and the second direction (Y-axis direction) in which the ink supplier 300 is spaced apart from the stage 500. The printing pad 100 may repeat the operations of moving in the second direction (Y-axis direction) and the third direction (Z-axis direction) along the shaft to transfer or print the ink of the ink supplier 300 to the target object on the stage 500.

In this case, the printing pad 100 may have a specific shape depending on the target object so as to transmit sufficient pressure to the target object while contacting the target object. Accordingly, the ink may be printed or transferred with sufficient adhesion to the target object. Details of the printing pad 100 will be further described with reference to other drawings.

Figure 5:
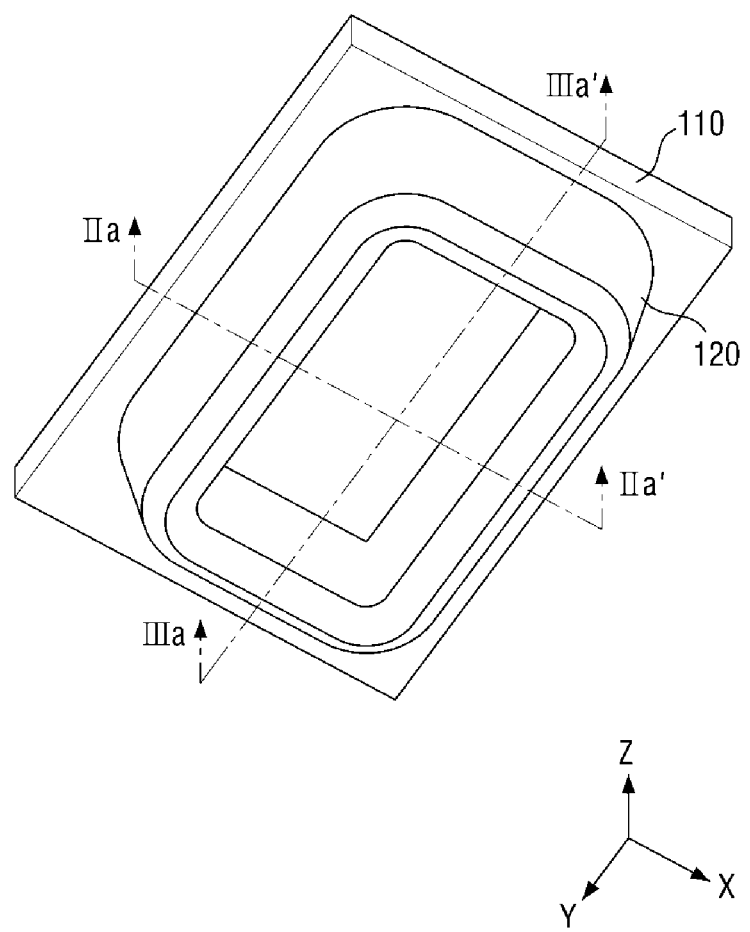
FIG. 5 is a perspective view illustrating an exemplary embodiment of a printing pad.
Figure 6:
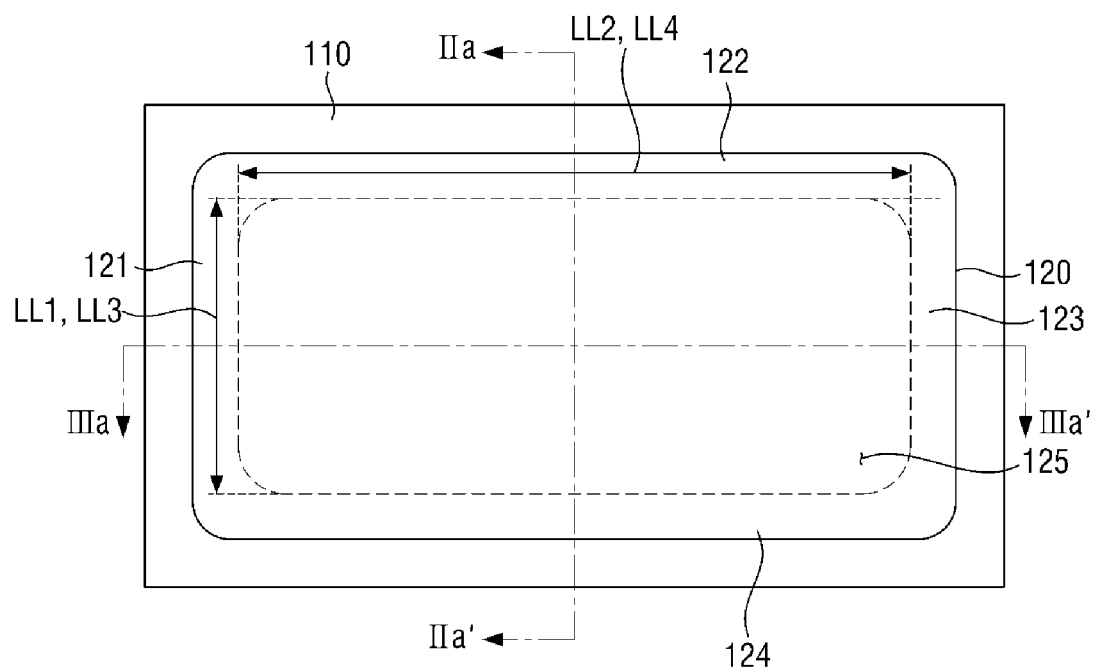
FIG. 6 is a schematic plan view of the printing pad of FIG. 5.
Figure 7:
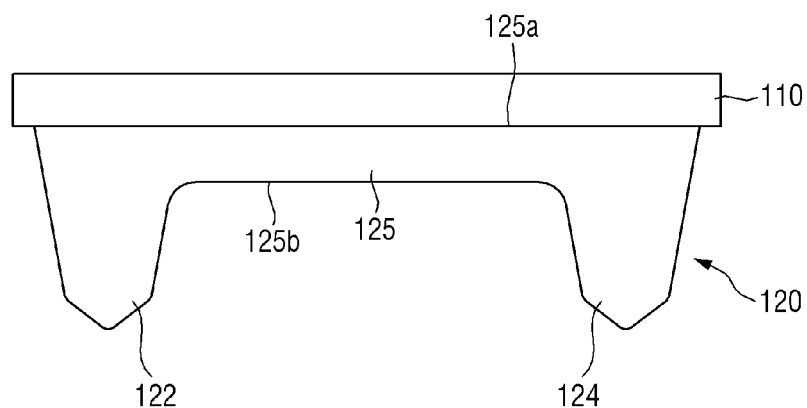
FIG. 7 is a cross-sectional view taken along line IIa-IIa' of FIG. 5.
Figure 7:
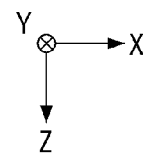
Figure 8:
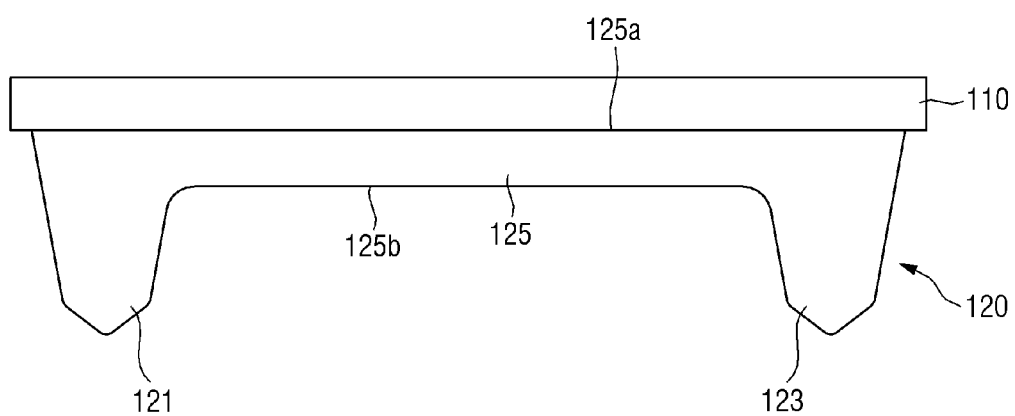
FIG. 8 is a cross-sectional view taken along line IIIa-IIIa' of FIG. 5.
Figure 8:
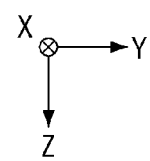

FIG. 5 is a perspective view illustrating an exemplary embodiment of a printing pad, FIG. 6 is a schematic plan view of the printing pad of FIG. 5, FIG. 7 is a cross-sectional view taken along line IIa-IIa' of FIG. 5, and FIG. 8 is a cross-sectional view taken along line of FIG. 5. FIG. 6 is a plan view of the printing pad 100 of FIG. 5 viewed in the third direction (Z-axis direction), for example, viewed upward from the printing pad 100 below. FIG. 7 is a cross-sectional view of the printing pad 100 of FIG. 5 taken in the first direction (X-axis direction), and FIG. 8 is a cross-sectional view of the printing pad 100 of FIG. 5 taken in the second direction (Y-axis direction).

Referring to FIGS. 5 to 8, the printing pad 100 in an exemplary embodiment may include a jig portion 110 and a pad portion 120.

The jig portion 110 may be a substrate to which the pad portion 120 is attached. The pad portion 120 may be attached to one surface of the jig portion 110, for example, the lower surface of the jig portion 110 in the drawing, and a shaft (not shown) capable of moving in the second direction (Y-axis direction) and the third direction (Z-axis direction) may be engaged to the other surface of the jig portion 110, for example, the upper surface of the jig portion 110 in the drawing. The pad portion 120 attached to the jig portion 110 may be brought into contact with the target object on the ink supplier 300 and the stage 500.

The shape of the jig portion 110 is not particularly limited. Although it is shown in the drawings that the jig portion 110 has a rectangular shape in a plan view, the invention is not limited thereto, and the jig portion 110 may have various shapes. However, the jig portion 110 may have a shape in which the area of the other surface of the jig portion 110, to which the pad portion 120 is attached, is larger than the planar area of the pad portion 120. That is, the jig portion 110 may have a predetermined size such that each outer frame portion of the pad portion 120 does not protrude from the jig portion 110.

When the area of the other surface of the jig portion 110 is smaller than the area of the pad portion 120, at least a part of the pad portion 120 may protrude from the jig portion 110. In this case, when the protruding region of the pad portion 120 is in contact with the ink supplier 300 or the target object, sufficient pressure may not be applied to the contact surface therebetween. A part of the target object contacting the protruding region of the pad portion 120 may be insufficient to adhesion to the ink, and thus be vulnerable to an external impact. Therefore, in order to prevent this problem, in the jig portion 110 in an exemplary embodiment, the area of the other surface of the jig portion, to which the pad portion 120 is attached, may be larger than the planar area of the pad portion 120.

The pad portion 120 may include a body portion 125, one surface of which is attached to the jig portion, and outer frame portions 121, 122, 123, and 124 which are provided by protruding a part of the other surface of the body portion 125. The body portion 125 and the outer frame portions 121, 122, 123 and 124 refer to specific positions or regions of the pad portion 120, and it does not mean that the body portion 125 and the outer frame portions 121, 122, 123 and 124 are provided as separate members, and the separate members are coupled or engaged with each other to constitute the pad portion 120. That is, in this specification, in order to separately describe specific positions or region of the pad portion 120, the corresponding regions are referred to as "body portion" and "outer frame portions". Substantially, the body portion 125 and the outer frame portions 121, 122, 123, and 124 are unitary to constitute one pad portion 120. However, the invention is not limited thereto.

The pad portion 120 may include a stretchable material such as silicone rubber. As will be described later, when an ink is printed on the target object, for example, the base member 12 using the printing pad 100, the pad portion 120 of the printing pad 100 are brought into contact with the target object. Here, since the pad portion 120 includes a stretchable material, the pad portion 120 may apply predetermined pressure to the region contacting the target object, and thus the shape of the pad portion 120 may be compressed or stretched.

One surface of the body portion of the pad portion 120 may attached to the jig portion 110, and the other surface thereof may be provided with the outer frame portions 121, 122, 123, and 124. Since the outer frame portions 121, 122, 123, and 124 have protruding shapes, in the printing pad 100, the body portion 125 may be a recessed region as compared with the outer frame portions 121, 122, 123, and 124.

When the printing pad 100 contacts the target object, the body portion 125 may perform a function of interconnecting and supporting the outer frame portions 121, 122, 123, and 124 without directly contacting the target object. However, the invention is not limited thereto, and in some cases, in the printing pad 100, the body portion 125 may be omitted, and the outer frame portions 121, 122, 123, and 124 may be separately provided to be spaced apart from each other.

The shape of the body portion 125 is not particularly limited, but the body portion 125 may have a shape for transmitting the pressure transmitted through jig portion 110 to the outer frame portions 121, 122, 123, and 124 when the shaft (not shown) moves in the third direction (Z-axis direction). That is, the body portion 125 may have substantially the same shape as that of the jig portion 110, and the planar size of the body portion 125 may be smaller than that of the jig portion 110. In an exemplary embodiment, in the printing pad 100 of the cover glass 10, the body portion 125 may have various shapes depending on the shape of the cover glass 10 that is a target object to which an ink is to be printed or transferred. In an exemplary embodiment, as shown in the drawing, the body portion 125 may have a rectangular shape in which respective sides face each other, corners where the respective sides meet each other may be curved in a rounded shape, for example. However, the invention is not limited thereto.

The outer frame portions 121, 122, 123, and 124 are disposed on the other surface of the body portion 125 such that they face the target object to which an ink is to be printed or transferred. When the printing pad 100 contacts the target object, the outer frame portions 121, 122, 123, and 124 may be regions that directly contact the target object. The outer frame portions 121, 122, 123, and 124 may prevent the body portion 125 from contacting the ink supplier 300, and the ink may be selectively printed or transferred only to the region contacting the outer frame portions 121, 122, 123, and 124.

In an exemplary embodiment of the printing pad 100, the outer frame portions 121, 122, 123, and 124 may have a shape in which at least a part of the body portion 125 protrudes in one direction, and the ink may be selectively printed only to the chamfer area CA of the cover glass 10. As shown in the drawing, the outer frame portions 121, 122, 123, and 124 protrude from the outer sides of the body portion 125 in the third direction (Z-axis direction) to have a shape having a predetermined height. Further, the outer frame portions 121, 122, 123, and 124 may extend in the first direction (X-axis direction) or second direction (Y-axis direction) in which the outer sides of the body portion 125 extend, and may be connected to each other at corners where they cross each other to be unitary into one member.

That is, the printing pad 100 may have a shape in which the center portion of a three-dimensional structure having a predetermined volume is concavely recessed and the outer side portion thereof is relatively protruded to from a mountaintop. In an exemplary embodiment, the protruded outer side portion may surround the concavely recessed center portion, and one end of the protruded outer side portion may be inclined with a predetermined inclination or may be rounded with a predetermined curvature.

More specifically, in the body portion 125 of the printing pad 100, one surface 125a contacting the jig portion 110 and the other surface 125b provided with the outer frame portions 121, 122, 123, and 124 may be comparatively flat surfaces. Since each of the outer frame portions 121, 122, 123, and 124 has a predetermined thickness, the area of the other surface 125b of the body portion 125 may be smaller than the area of one surface 125a of the body portion 125. As shown in the cross-sectional views of FIGS. 7 and 8, the outer side portion of the other surface 125b of the body portion 125, contacting the outer frame portions 121, 122, 123, and 124, may be recessed toward the inner side of the body portion 125 from the outer side portion of one surface 125a of the body portion 125. A space surrounded by the outer frame portions 121, 122, 123, and 124 is defined on the other surface 125b of the body portion 125, and thus the other surface 125b of the body portion 125 may not contact the target object or the ink supplier 300.

The outer frame portions 121, 122, 123, and 124 may include the first outer frame 121 and third outer frame 123 extending in the first direction (X-axis direction) and spaced apart from each other to face each other, and the second outer frame 122 and fourth outer frame 124 extending in the second direction (Y-axis direction) and spaced apart from each other to face each other. However, as described above, the printing pad 100 is provided by unitary members into one member, and, for convenience of explanation, the outer frame portions 121, 122, 123, and 124 may also be referred to according to the positions thereof. The outer frame portions 121, 122, 123, and 124 may be unitary at corners where they meet each other, and thus each of the corners may have an angled shape. However, the invention is not limited thereto, and each of the corners may be rounded.

The first outer frame portion 121 and the third outer frame portion 123 are outer frame portions disposed on upper and lower side surfaces of the pad portion 120 in a plan view, and the second outer frame portion 122 and the fourth outer frame portion 124 are outer frame portions disposed on the right and left side surfaces of the pad portion 120 in a plan view. In an exemplary embodiment, the respective outer frame portions of the pad portion 120, for example, the first and third outer frame portions 121 and 123 and the second and fourth outer frame portions 122 and 124 may extend to have different lengths from each other.

As will be described later, each of the outer frame portions 121, 122, 123 and 124 may be brought into contact with the chamfer area CA of the cover glass 10 as an object to be printed to print or transfer an ink. The printed ink may form a light blocking area NDA of the cover glass 10, and the cover glass 10 in an exemplary embodiment may include a first light blocking area NDA1 and a second light blocking area NDA2, which have different lengths from each other. Since the ink is printed or transferred in the area where the printing pad 100 and the target object, for example, the base member 12 of the cover glass 10 to form the light blocking area, the shape of each of the outer frame portions 121, 122, 123, and 124 of the pad portion 120 may be changed depending on the shape of the light blocking area NDA.

In an exemplary embodiment, the lengths LL1 and LL3 of the first and third outer frames 121 and 123 extending in the first direction (X-axis direction) may be shorter than the lengths LL2 and LL4 of the second and fourth outer frames 122 and 124 extending in the second direction (Y-axis direction), for example. In an exemplary embodiment, when the target object to which an inks is to be printed or transferred has a rectangular shape including both long sides and both short sides and a predetermined ink is printed or transferred to the long sides and the short sides, the outer frame portions 121, 122, 123, and 124 of the pad portion 120 may have different lengths from each other depending on the shapes of the long sides and short sides, for example. In order to form the light blocking member 15 in the light blocking area NDA of the cover glass 10 shown in FIGS. 1 to 3, in accordance with the lengths of both long sides LS1 and LS2 and both short sides SS1 and SS2 of the base member 12, the lengths of the first and third outer frame portions 121 and 123 of the pad portion 120 may be shorter than the lengths of the second and fourth outer frame portions 122 and 124 thereof. That is, the first and third outer frame portions 121 and 123 may contact the first and second short sides SS1 and SS2 of the base member 12 of FIGS. 1 to 3, and the second and fourth outer frame portions 122, and 124 may contact the first and second long sides LS1 and LS2 thereof.

The outer sidewall and inner sidewalls of each of the outer frames 121, 122, 123, and 124 may extend in the third direction (Z-axis direction) to be connected to the body portion 125. The shapes of the outer side wall and the inner side wall are not particularly limited, but, in an exemplary embodiment, the outer sidewall and the inner sidewall may be inclined with respect to the body portion 125 so as to have an inclination of an acute angle. That is, each of the outer frames 121, 122, 123, and 124 may have a shape in which its width is gradually narrowed as they extend in the third direction (Z-axis direction).

One end of each of the outer frame portions 121, 122, 123, and 124, contacting the target object, may have a narrower width than the area connected to the body portion 125. When the printing pad 100 is brought into contact with the target object to print or transfer an ink, in order to print or transfer the ink only onto the narrow area of the target object, the contact area of the printing pad 100 with the target object may be small. The pad portion 120 of the printing pad 100 in an exemplary embodiment may have a shape in which the width of each of the outer frame portions 121, 122, 123, and 124 is narrowed toward one end thereof. Thus, the contact area of each of the outer frame portions 121, 122, 123, and 124 of the pad portion 120 with the target object may be narrow.

One end of each of the outer frame portions 121, 122, 123, and 124 may have a predetermined central angle and an inclined side surface as its width is narrowed, but the invention is not limited thereto. In an exemplary embodiment, as shown in the drawing, one end of each of the outer frame portions 121, 122, 123, and 124 may be rounded with a predetermined curvature, for example.

In another exemplary embodiment, the pad portion 120 unlike that shown in FIG. 5, may not be unitary, and may be provided such that the outer frame portions 121, 122, 123, and 124 are spaced apart from each other. As described above, since the target object to be printed has a rectangular shape, when the length extending in the first direction (X-axis direction) is different from the length extending in the second direction (Y-axis direction), the printing process may be performed with pads which are different from each other in a region extending in the first direction (X-axis direction) and a region extending in the second direction (Y-axis direction). A detailed description thereof is referred to another exemplary embodiment.

As described above, the base member 12 of the cover glass 10 may include a flat area SA and a chamfer area CA, and the light blocking member 15 may be disposed on the chamfer area CA and at least a part of the flat area SA. In the flat area SA of the base member 12, even when a pad having a different shape from that of the printing pad 100 of FIGS. 5 to 8 is used, the contact between the pad and the base member 12 is easy, so that the first light blocking layer 15a and second light blocking layer 15b disposed on the flat area SA may have sufficient durability and adhesion. However, in the chamfer area CA of the base member 12, when a conventional pad is used, the direct contact between the pad and the base member 12 is difficult, so that the third light blocking layer 15c disposed on the chamfer area CA may not have sufficient durability, and thus the third light blocking layer 15c may be damaged in some cases.

In an exemplary embodiment, the pad portion 120 of the printing pad 100 may be in contact with the base member 12 of the cover glass 10, and the contact area between the pad portion 120 and the base member 12 may include at least the chamfer area CA of the base member 12.

The printing pad 100 in an exemplary embodiment may induce a smooth contact between the chamfer area CA of the base member 12 and the pad portion 120, and may improve the durability and adhesion of the third light blocking layer 15c disposed on the chamfer area CA. Since one end of each of the outer frame portions 121, 122, 123, and 124 of the printing pad 100 may directly contact the chamfer area CA of the base member 12, the outer frame portions 121, 122, 123, and 124 may apply relatively high pressure to allow ink to be printed or transferred to the chamfer area CA. Thus, the ink printed or transferred on the chamfer area CA may form the third light blocking layer 15c having high durability and adhesion.

The method of manufacturing the cover glass 10 in an exemplary embodiment may include forming the third light blocking layer 15c on the chamfer area CA using the printing pad of FIGS. 5 to 8. Hereinafter, the method of manufacturing the cover glass 10 in an exemplary embodiment will be described in detail.

Figure 9:
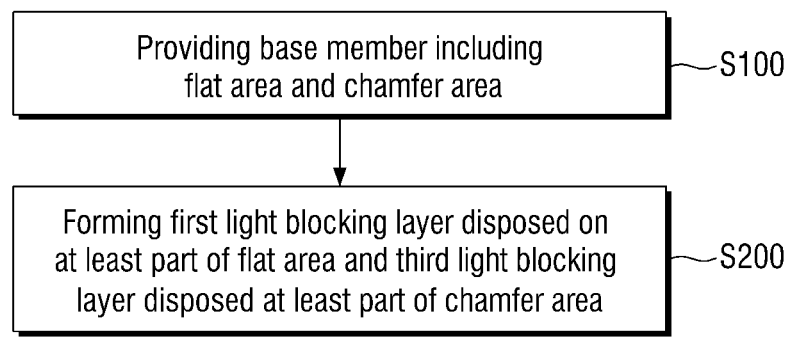
FIG. 9 is a flowchart illustrating an exemplary embodiment of a method of manufacturing a cover glass.

FIG. 9 is a flowchart illustrating an exemplary embodiment of a method of manufacturing a cover glass.

Referring to FIG. 9, the method of manufacturing a cover glass in an exemplary embodiment includes the operations of (S100) providing a base member 12 including a flat area SA, one surface of which is parallel to the first direction (X-axis direction) and a chamfer area CA adjacent to the flat area SA and not parallel to the first direction (X-axis direction), and (S200) forming a first light blocking layer 15a disposed on at least a part of the flat area SA adjacent to the chamfer area CA and a third light blocking layer 15c disposed on at least a part of the chamfer area CA and partially contacting one end of the first light blocking layer 15a.

The method of manufacturing a cover glass 10 in an exemplary embodiment may include a first process of forming a first light blocking layer 15a, or a first light blocking layer 15a and a second light blocking layer 15b on a flat area SA, and a second process of forming a third light blocking layer 15c on a chamfer area CA. That is, the method of manufacturing a cover glass may include the operations of (S210) forming a first light blocking layer 15a, or a first light blocking layer 15a and a second light blocking layer 15b, and (S220) forming a third light blocking layer 15c, through different processes from each other.

First, the operation S210 of forming the first light blocking layer 15a and the second light blocking layer 15b will be described.

Figure 10:
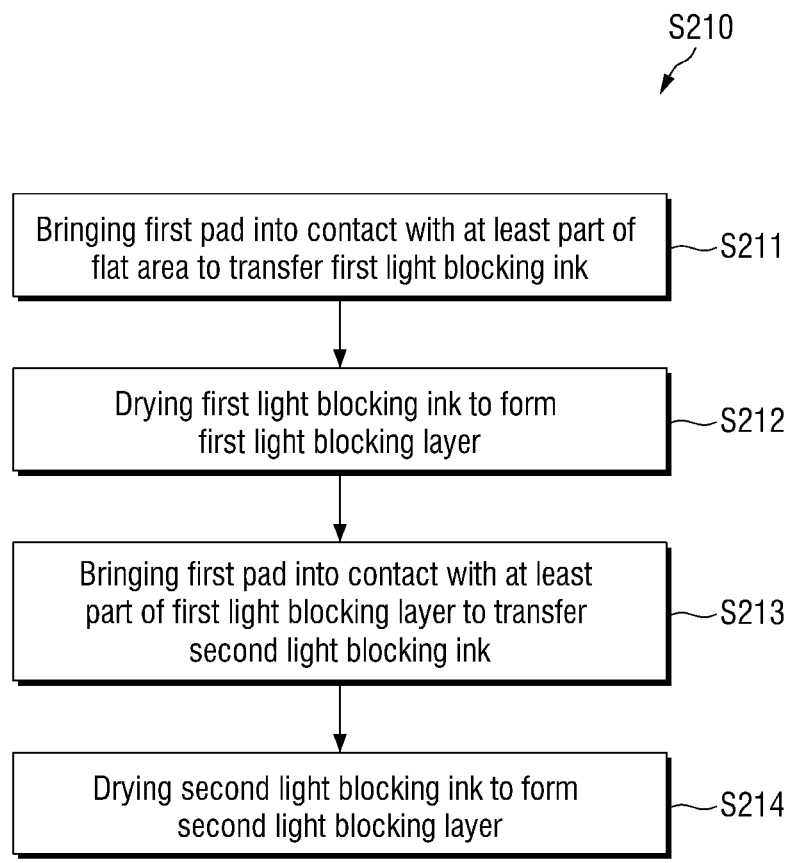
FIG. 10 is a flowchart illustrating an exemplary embodiment of a part of a method of manufacturing a cover glass.

FIG. 10 is a flowchart illustrating an exemplary embodiment of a part of a method of manufacturing a cover glass. FIGS. 11 to 17 are cross-sectional views illustrating the manufacturing method of FIG. 10.

Referring to FIGS. 10 to 17, the operation S210 of forming the first light blocking layer 15a and the second light blocking layer 15b may include the operations of (S211) bringing a first pad 101 contacting the flat area SA into contact with at least a part of the flat area SA and transferring a first light blocking ink 15a' to the contact area, (S212) drying the first light blocking ink 15a' to form a first light blocking layer 15a, (S213) bringing the first pad 101 into contact with at least a part of the first light blocking layer 15a and transferring a second light blocking ink 15b' to the contact area, and (S214) drying the second light blocking ink 15b' to form a second light blocking layer 15b.

Figure 11:
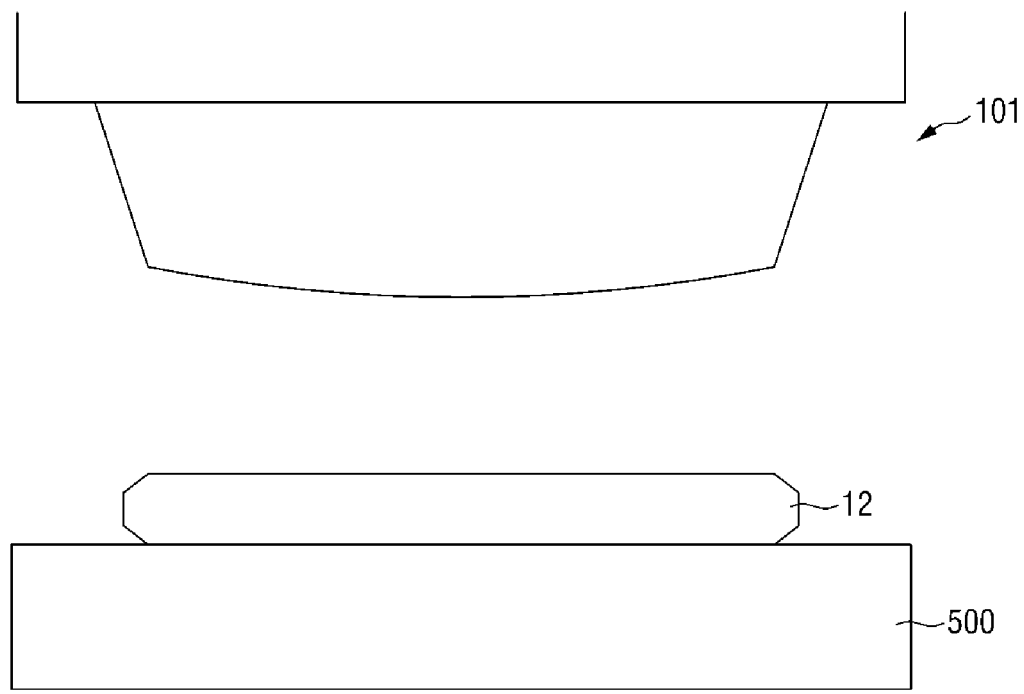
FIGS. 11 to 17 are cross-sectional views illustrating the manufacturing method of FIG. 10.

As shown in FIG. 11, a base member 12 including a flat area SA (refer to FIG. 3) and a chamfer area CA (refer to FIG. 3) is provided on a stage 500 (S100). Since a detailed description of the base member 12 is the same as that having been described above, a redundant description will be omitted. It is shown in the drawings that the upper surface of the base member 12 includes a flat area SA parallel to the first direction (X-axis direction) and a chamfer area CA disposed adjacent to the flat area SA and at least partially inclined. However, the invention is not limited thereto, and the base member 12 may be greatly inclined or may be rounded.

Figure 12:
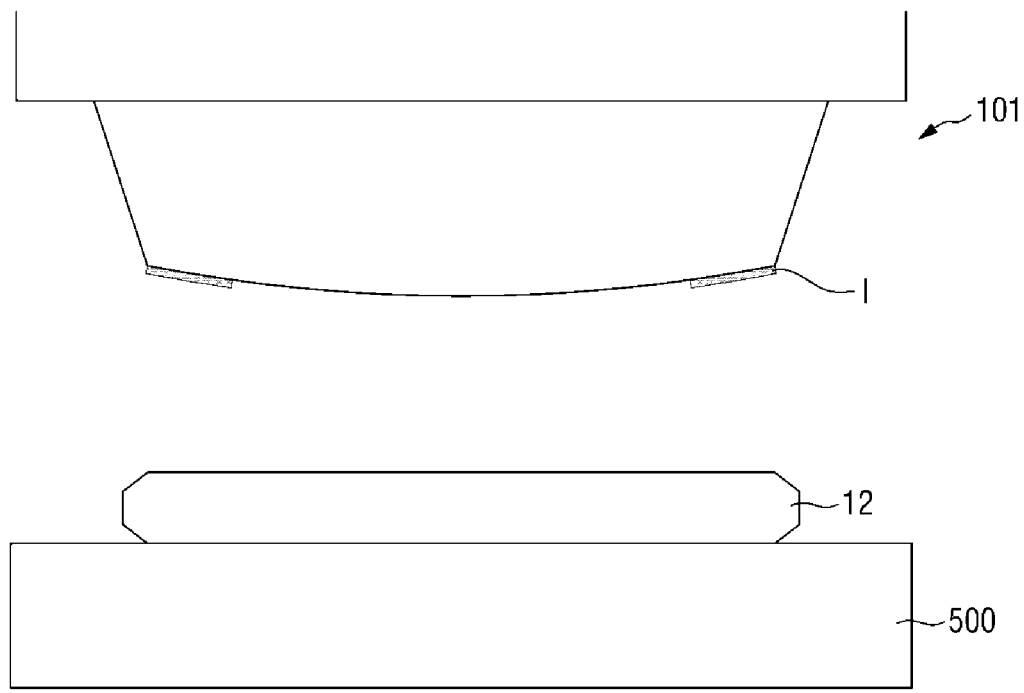
Figure 13:
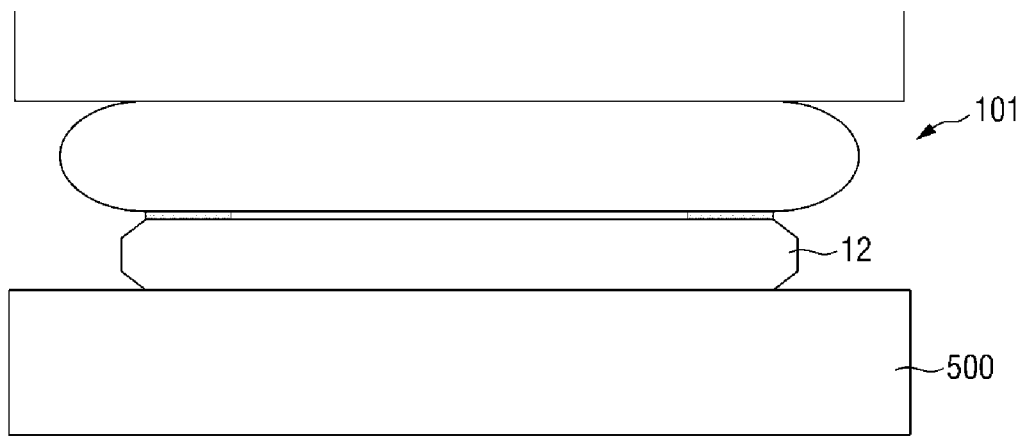
Figure 14:
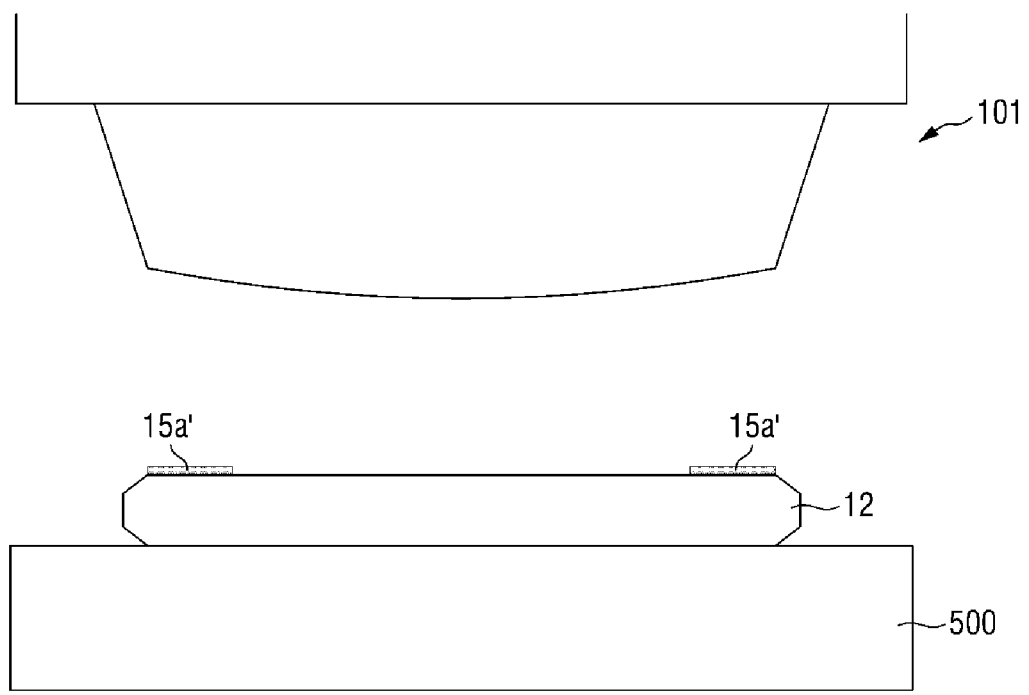

Next, as shown in FIGS. 12 and 14, a first light blocking ink 15a' is transferred onto the flat area SA of the base member 12 using a first pad 101 (S211). In an exemplary embodiment, the operation of forming the first light blocking layer 15a may be performed using the first pad 101 where at least a part of the outer surface thereof is flat and smoothly rounded and the center portion thereof is not recessed. Unlike the printing pad 100 having been described with reference to FIGS. 5 to 8, the outer surface of the first pad 101 is not recessed, and thus the first pad 101 may be entirely in contact with the ink supplier 300.

However, as shown in the drawings, the ink (for example, the first light blocking ink 15a' or the second light blocking ink 15b' is transferred only to the outer side portion from the center portion of the first pad 101, thereby forming the first light blocking layer 15a and the second light blocking layer 15b disposed on the outer side portion adjacent to the chamfer area CA in the flat area SA of the base member 12. The ink I may be transferred to the outer side portion of the first pad 101, and the first pad 101 and the base member 12 may be in contact with each other, thereby printing or transferring the first light blocking ink 15a' onto the base member 12.

In an exemplary embodiment, the ink I may include a material absorbing incident light or blocking the transmission of light. That is, the ink I may include substantially the same material as that of the light blocking member 15. Further, the first pad 101 and a second pad 102 or a printing pad 100, which will be described later, may include a flexible material whose shape is changed by external force. As shown in the drawings, when the first pad 101 is in contact with the base member 12, the first pad 101 may be expanded in a direction perpendicular to compressive force by the compressive force. Accordingly, the area where the first pad 101 and the base member 12 are in contact with each other may be larger than the area where the first light blocking ink 15a' is printed. In an exemplary embodiment, the first pad 101, the second pad 102, or the printing pad 100 may include a material such as silicone rubber, for example. However, the invention is not limited thereto.

Figure 15:
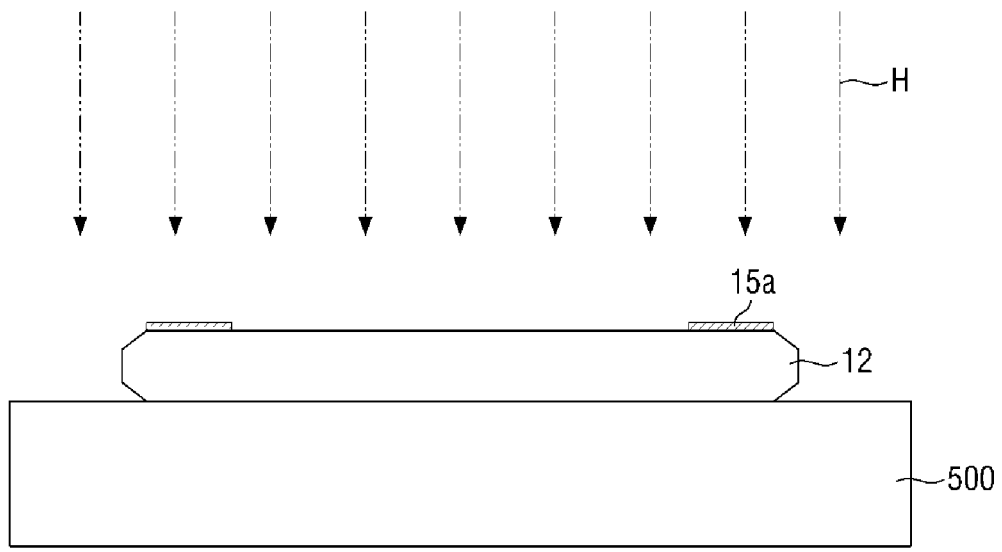
Figure 16:
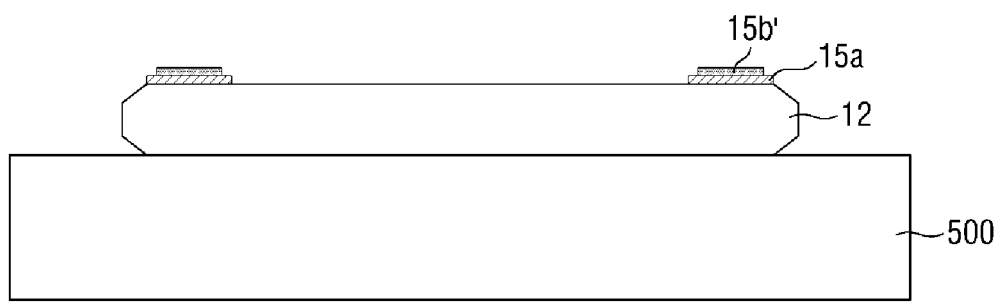
Figure 17:
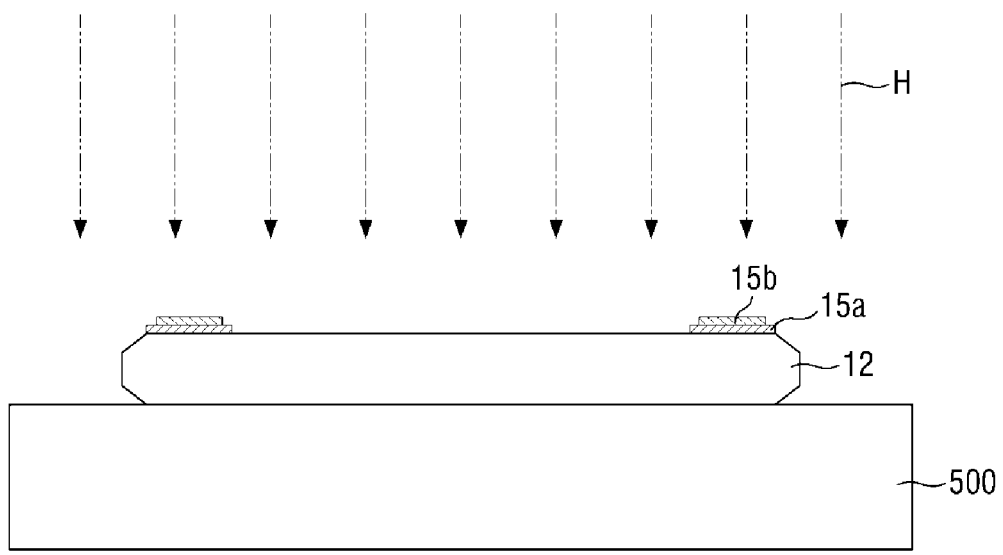

Next, as shown in FIG. 15, the operation S212 of drying the transferred first light blocking ink 15a' to form the first light blocking layer 15a is performed. The first light blocking ink 15a' may have a formulation of a solution having fluidity. When the first light blocking layer 15a is provided without drying the first light blocking ink 15a', the first light blocking ink 15a' may be transferred to the first pad 101 again, or the shape thereof may be damaged. Therefore, the first light blocking ink 15a' is transferred and then dried to forming the first light blocking layer 15a.

In an exemplary embodiment, the drying of the first light blocking ink 15a' may be performed at a temperature of about 60° C. to about 80° C., for example. In an exemplary embodiment, the drying of the first light blocking ink 15a' may be performed using a heat H. However, the invention is not limited thereto.

Next, similarly to the method of forming the first light blocking layer 15a, a second light blocking ink 15b' is transferred using the first pad 101 (S213), and is then dried to form a second light blocking layer 15b (S214). A detailed description thereof will be described. However, as described above, since the width Wb of the second light blocking layer 15b is narrower than the width Wa of the first light blocking layer 15a, both ends of the first light blocking layer 15a may protrude from both ends of the second light blocking ink 15b' in the operation of transferring the second light blocking ink 15b'.

Next, the operation S220 of forming a third light blocking layer 15c on the base member 12 provided with the first light blocking layer 15a and the second light blocking layer 15b will be described.

Figure 18:
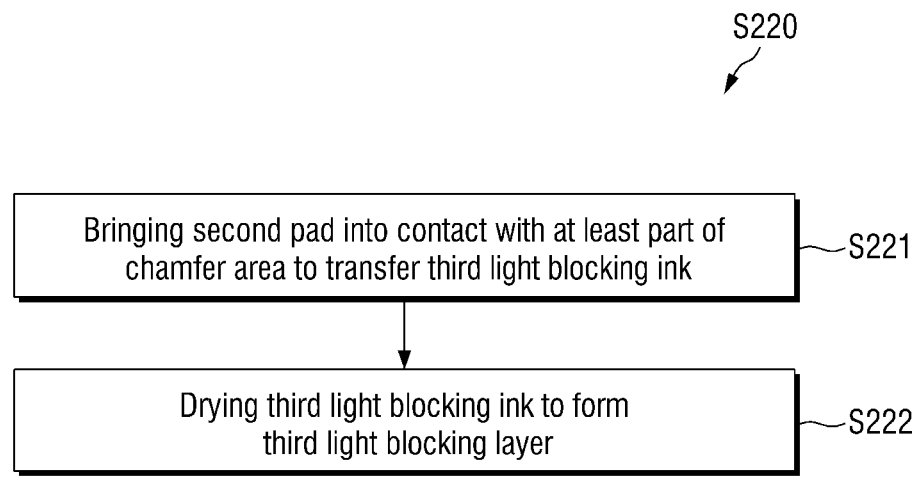
FIG. 18 is a flowchart illustrating an exemplary embodiment of a method of forming a third light blocking layer.
Figure 19:
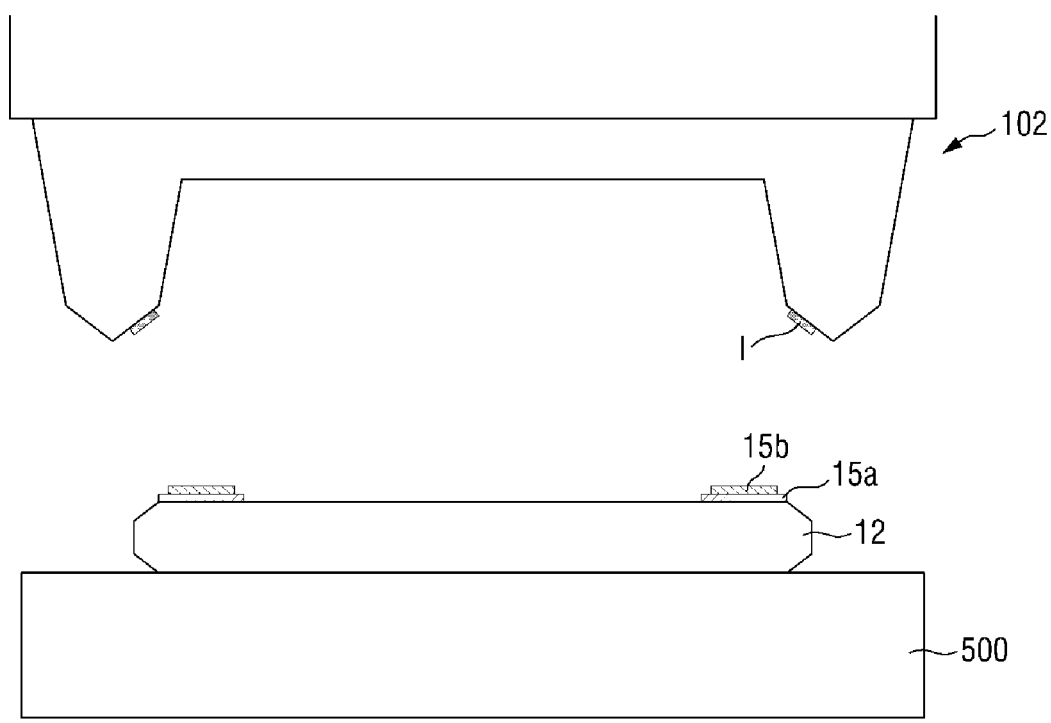
FIGS. 19 to 21 are cross-sectional views according to the flowchart of FIG. 18.
Figure 20:
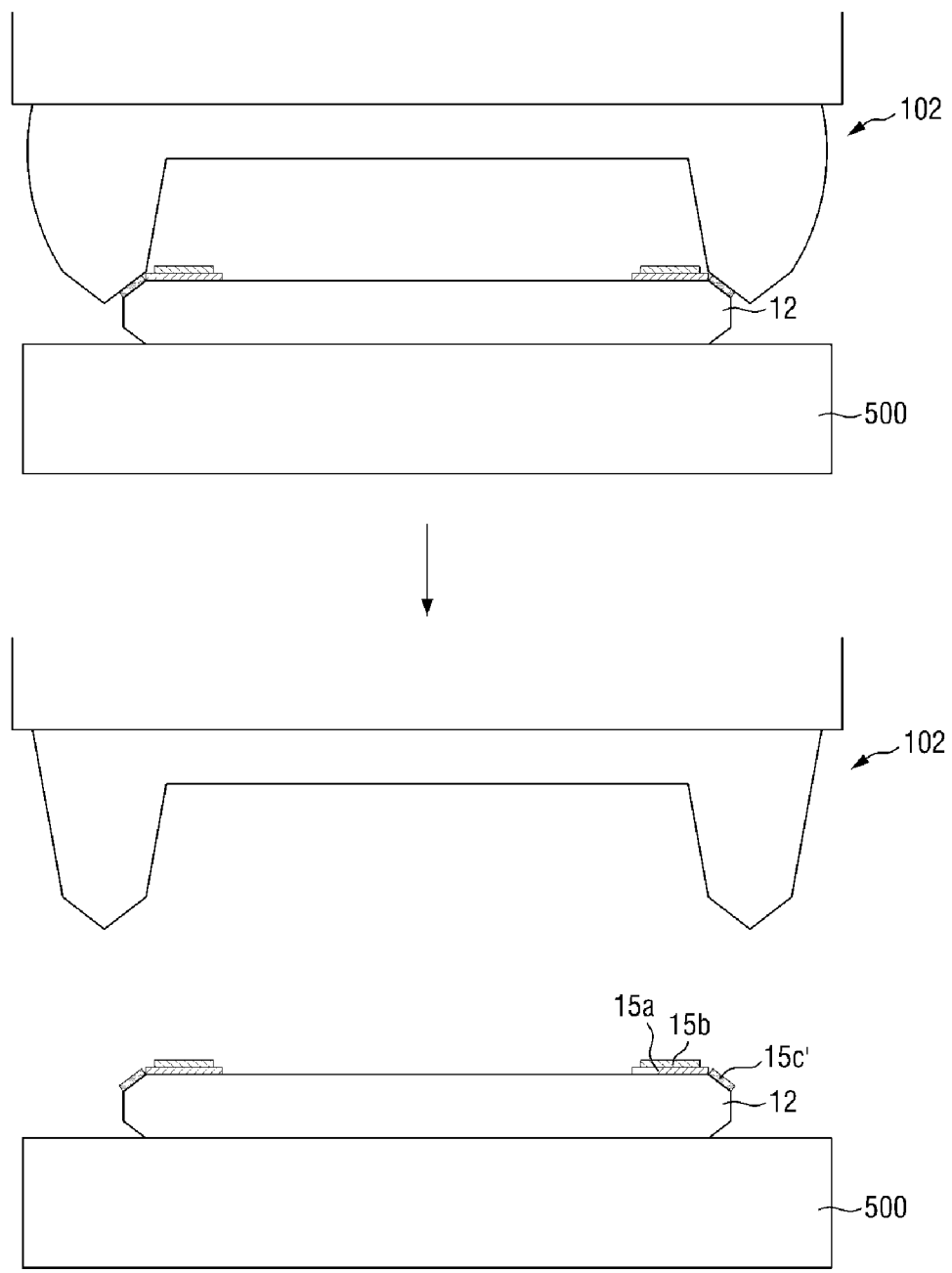
Figure 21:
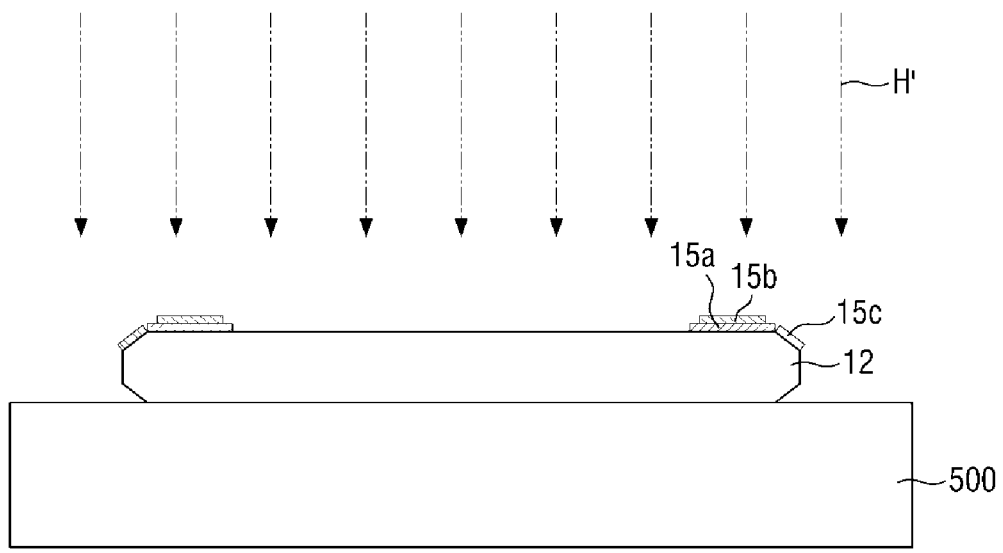

FIG. 18 is a flowchart illustrating an exemplary embodiment of a method of forming a third light blocking layer. FIGS. 19 to 21 are cross-sectional views according to the flowchart of FIG. 18.

Referring to FIGS. 18 to 21, the operation S220 of forming a third light blocking layer 15c may include the operations of (S221) bringing a second pad 102 contacting the chamfer area CA of the base member 12 and having a different shape from that of the first pad 101 into contact with at least a part of the chamfer area CA to transfer a third light blocking ink 15c' to the contact area, and (S222) drying the third light blocking ink 15c' to form a third light blocking layer 15c.

In the operation S221 of forming the third light blocking layer 15c, unlike the first pad 101, a concavely recessed center portion may be defined in the second pad 102. In an exemplary embodiment, the second pad 102 may be the printing pad 100 of FIGS. 5 to 8. That is, the second pad 102 may include a body portion 125 and outer frame portions 121, 122, 123, and 124. Since the shape of the second pad 102 is substantially the same as that of the printing pad 100, a detailed description thereof will be omitted.

In an exemplary embodiment, the second pad 102, that is, the printing pad 100, may be brought into contact with at least the chamfer area CA of the base member 12, and on end of each of the outer frame portions 121, 122, 123 and 124 of the printing pad 100 may be brought into contact with the chamfer area CA. As shown in the drawing, the ink I provided from the ink supplier 300 is transferred only to one end of the outer frame portions 121, 122, 123 and 124, and the one end is selectively brought into contact with the chamfer area CA to transfer the ink I onto the contacted chamfer area CA, thereby obtaining the third light blocking ink 15c'. Then, the operation S222 of drying the third light blocking ink 15c' is performed to form a third light blocking layer 15c. Since the method of forming the third light blocking layer 15c by transferring and drying the third light blocking ink 15c' is substantially the same as the method of forming the first light blocking layer 15a and the second light blocking layer 15b, a detailed description thereof will be omitted.

In an exemplary embodiment of the printing pad 100, the ink I transferred to one end of each of the outer frame portions 121, 122, 123, and 124 may be selectively printed on the chamfer area CA, and the third light blocking layer 15c may be selectively provided in the chamfer area CA of the base member 12. Unlike the first pad 101, the printing pad 100 may apply high pressure to the chamfer area CA having a relatively narrow area, and thus the third light blocking layer 15c disposed in the chamfer area CA may have high adhesion to the base member 12.

In an exemplary embodiment, the operation S222 of drying the third light blocking ink 15c' may be performed at a temperature of about 150° C. to about 180° C., for example. In an exemplary embodiment, the drying the third light blocking ink 15c' may be performed by a heat H'. Since the operation S222 of drying the third light blocking ink 15c' is performed at a higher temperature than the operations S212 and S214 of drying the first light blocking ink 15a' and drying the second light blocking ink 15b', the first light blocking ink 15a' and the second light blocking ink 15b', which are not completely dried, may be dried. However, the invention is not limited thereto.

Through the above method, the cover glass 10 in an exemplary embodiment may be manufactured. The light blocking member 15 may be disposed on each of the flat area SA and the chamfer area CA using the first pad 101 and the second pad 102 or the first pad 101 and the printing pad 100, having different shapes from each other, on the base member 12 including the flat area SA and the chamfer area CA. That is, when pads having different shapes from each other are used such that sufficient pressure may be applied to specific areas of the base member 12 having different shapes, the light blocking member 15 disposed on each of the areas may have sufficient adhesion.

The method of manufacturing the cover glass using the pad printing apparatus 1000 is not limited thereto. In some cases, the process of forming the first light blocking layer 15a and the second light blocking layer 15b may be performed after the process of forming the third light blocking layer 15c.

Figure 22:
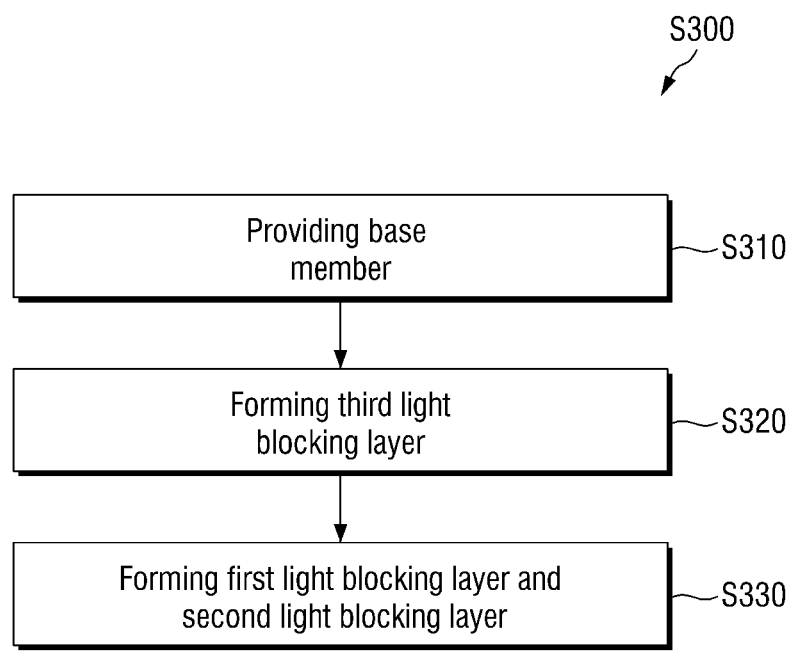
FIG. 22 is a flowchart illustrating another exemplary embodiment of a method of manufacturing a cover glass.

FIG. 22 is a flowchart illustrating another exemplary embodiment of a method of manufacturing a cover glass.

Referring to FIG. 22, the operation of forming a third light blocking layer 15c may precede the operation of forming a first light blocking layer 15a and a second light blocking layer 15b. That is, the method (i.e., operation S300) of manufacturing a cover glass in another exemplary embodiment may include the operations of (S310) providing a base member 12, (S320) forming a third light blocking layer 15c, and (S330) forming a first light blocking layer 15a and a second light blocking layer 15b. In the method of manufacturing a cover glass, as shown in FIG. 22, the third light blocking layer 15c, the first light blocking layer 15a, and the second light blocking layer 15b may be sequentially disposed on the base member 12.

When the third light blocking layer 15c is provided in the chamfer area CA of the base member 12 using the printing pad 100, the outer frame portions 121, 122, 123, and 124 of the pad portion 120 of the printing pad 100 are brought into contact with the first light blocking layer 15a and the second light blocking layer 15b, and thus the third light blocking layer 15c may be stepped. Thus, in the process of attaching the cover glass 10 to another member, for example, the display member 20, bubbles may be generated by the step provided by the light blocking member 15. Accordingly, in the method of manufacturing a cover glass 10 in another exemplary embodiment, the third light blocking layer 15c is first disposed on the chamfer area CA, and the first light blocking layer 15a and the second light blocking layer 15b are disposed on the flat area SA, thereby minimizing the step that may be provided on the cover glass 10.

In this case, although not shown in the drawing, the operation of drying the third light blocking ink 15c' may be performed at a temperature of about 60 degrees Celsius (° C.) to about 80° C., and the operation of drying the second light blocking ink 15b' may be performed at a temperature of about 150° C. to about 180° C., for example. That is, in the method of manufacturing the cover glass 10, the operation of drying a light blocking ink to form a final light blocking layer may be performed at higher temperature than the operation of drying a light blocking ink to form other light blocking layers. However, the invention is not limited thereto.

Further, as described above, in an exemplary embodiment of the cover glass 10, the base member 12 on which the light blocking member 15 is disposed may include both long sides LS1 and LS2 and both short sides SS1 and SS2. Accordingly, in the operation of forming third light blocking layer 15c, the third light blocking layer 15c may be disposed on both long sides LS1 and LS2 of the base member 12, and the third light blocking layer 15c may also be disposed on both short sides SS1 and SS2 of the base member 12 using another printing pad 100. That is, the outer frame portions 121, 122, 123, and 124 of the pad portion 120, having different lengths from each other, may be separated by different printing pads 100 from each other, thereby forming third light blocking layers 15c, respectively.

Figure 23:
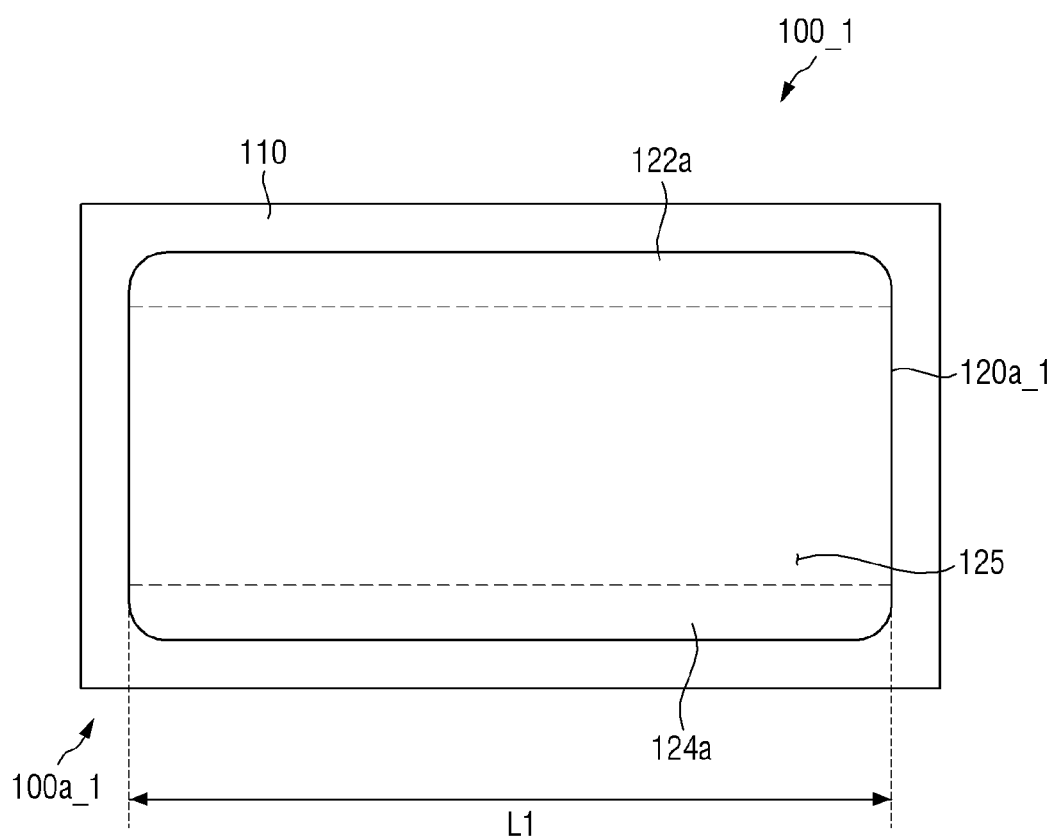
FIGS. 23 and 24 are schematic views illustrating other exemplary embodiments of printing pads.
Figure 24:
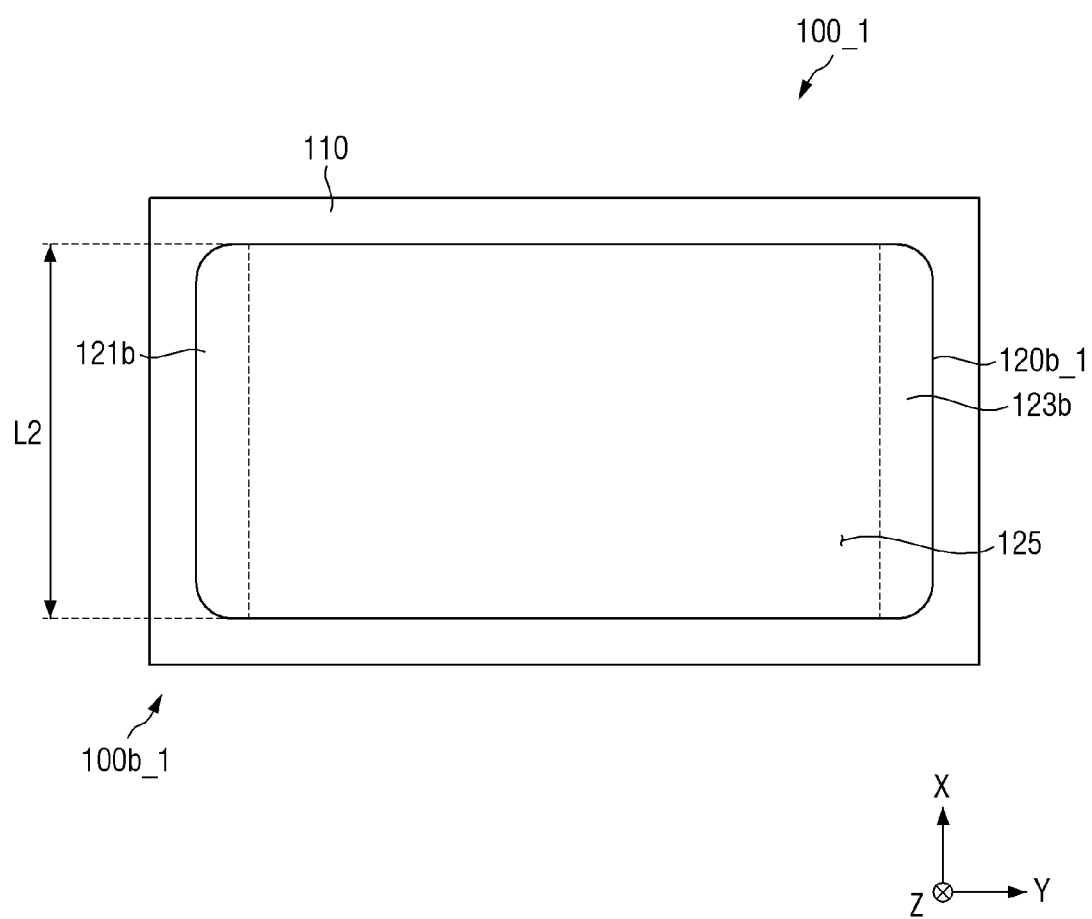

FIGS. 23 and 24 are schematic views illustrating other exemplary embodiments of printing pads.

Referring to FIGS. 23 and 24, a printing pad 100_1 may include a first printing pad 100a_1 for printing the chamfer area CA (refer to FIG. 3) of both long sides LS1 and LS2 (refer to FIG. 2) of the base member 12 and a second printing pad 100b_1 for printing the chamfer area CA of both short sides SS1 and SS2 (refer to FIG. 2) of the base member 12. That is, in an exemplary embodiment, the length L1 of each of the outer frame portions 122a and 124a of a pad portion 120a_1 of the first printing pad 100a_1, extending in one direction, may be longer than the length L2 of each of the outer frame portions 121b and 123b of a pad portion 120b_1 of the second printing pad 100b_1, extending in one direction.

Accordingly, the operation of forming the third light blocking layer 15c (refer to FIG. 3) may include the operations of forming a 3-1 light blocking layer on both long sides LS1 and LS2 of the base member 12 using the first printing pad 100a_1, and forming a 3-2 light blocking layer on both short sides SS1 and SS2 of the base member 12 using the second printing pad 100b_1. That is, the method of manufacturing the cover glass 10 may include the operations of forming the first light blocking layer 15a, forming the second light blocking layer 15b, forming the 3-1 light blocking layer, and forming the 3-2 light blocking layer, and, in this method, printing or transfer processes may be performed total four times.

As described above, the pad portion 120 (refer to FIG. 5) of the printing pad 100 may not be provided with the body portion 125. In this case, the pad portion 120 may include only the outer frame portions 121, 122, 123, and 124, and these outer frame portions 121, 122, 123, and 124 may be respectively provided by separate pads and may be spaced apart from each other.

Figure 25:
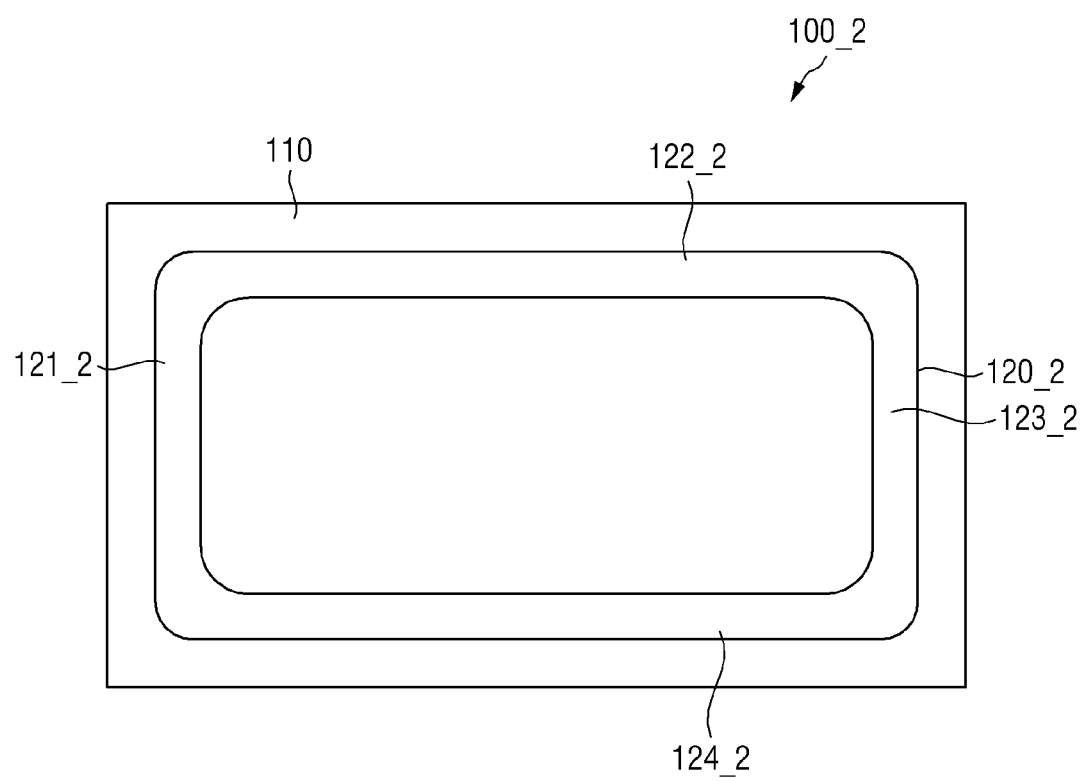
FIG. 25 is a schematic view illustrating another exemplary embodiment of a printing pad.

FIG. 25 is a schematic view illustrating another exemplary embodiment of a printing pad.

Referring to FIG. 25, a printing pad 100_2 may include only outer frame portions 121_2, 122_2, 123_2, 124_2 of a pad portion 120_2 without providing the body portion 125. Since the printing pad 100_2 of FIG. 25 is the same as the printing pad 100 of FIG. 5 except that the body portion 125 is not provided, a detailed description thereof will be omitted. The shape of the printing pad 100_2 not provided with the body portion 125 is not limited thereto, and, in some cases, the printing pad 100a_1 of FIG. 23 and the printing pad 100b_1 of FIG. 24 may not be provided with the body portion 125.

In the cover glass 10 (refer to FIG. 1), a larger number of areas may be inclined or rounded in addition to the chamfer area CA (refer to FIG. 3) disposed outside the base member 12.

Figure 26:
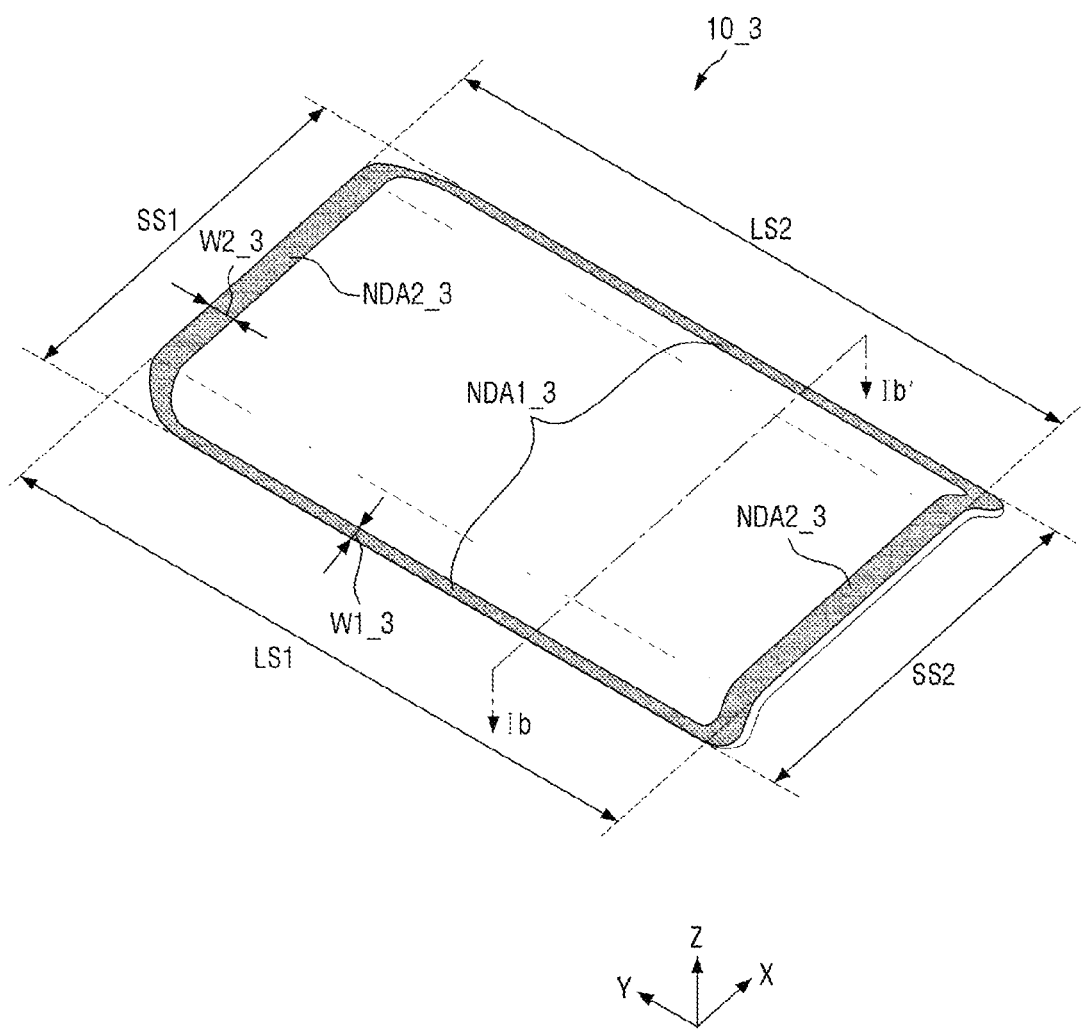
FIG. 26 is a schematic view illustrating another exemplary embodiment of a cover glass.
Figure 27:
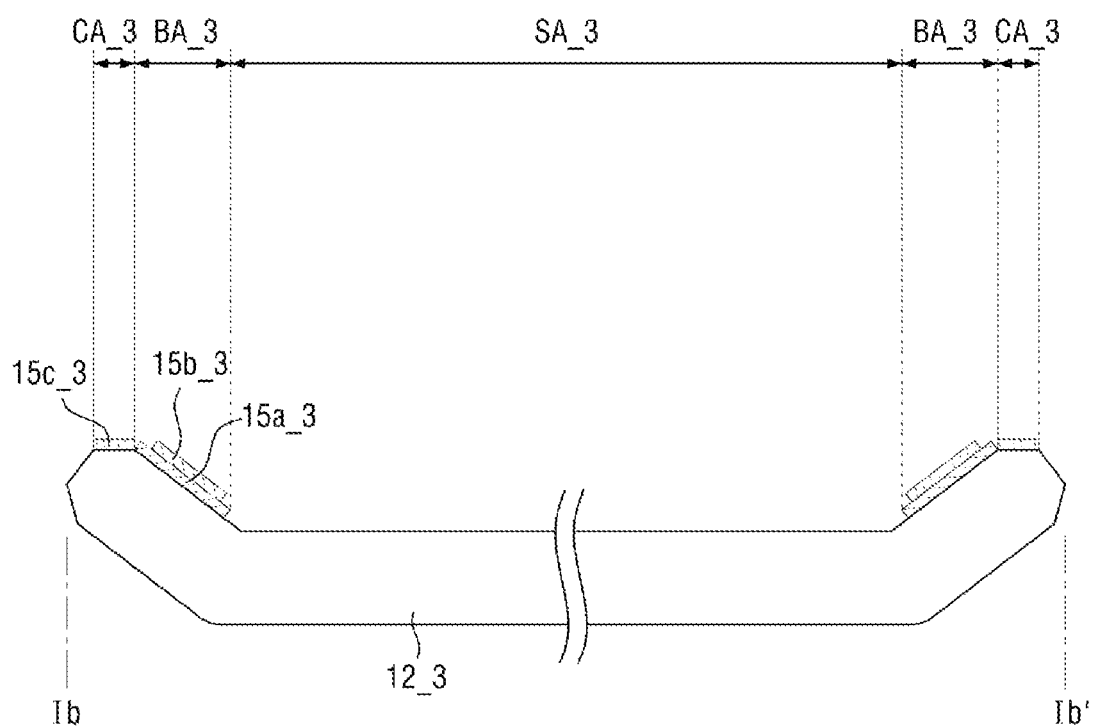
FIG. 27 is a cross-sectional view taken along line Ib-Ib' of FIG. 26.

FIG. 26 is a schematic view illustrating another exemplary embodiment of a cover glass. FIG. 27 is a cross-sectional view taken along line Ib-Ib' of FIG. 26.

Referring to FIGS. 26 and 27, a base member 12_3 of a cover glass 10_3 in another exemplary embodiment may further include a bending area BA_3 inclined at a predetermined angle between a flat area SA_3 and a chamfer area CA_3. Thus, a third light blocking layer 15c_3 of the cover glass 10_3 is disposed only in the chamfer area CA_3 without defining a first light blocking area NDA1_3 and a second light blocking area NDA2_3. The first light blocking layer 15a_3 and second light blocking layer 15b_3 of the first light blocking area NDA1_3 may be disposed only in the bending area BA_3, and the first light blocking layer 15a_3 and second light blocking layer 15b_3 of the second light blocking area NDA2_3 may be disposed on the flat area SA_3 and the bending area BA_3. That is, since the width W1_3 of the first light blocking area NDA1_3 disposed on both long sides LS1 and LS2 of the base member 12_3 is narrower than the width W2_3 of the second light blocking area NDA2_3, the first light blocking layer 15a_3 and the second light blocking layer 15b_3 may be disposed only in the bending area BA_3. Accordingly, when the first pad 101 forming the first light blocking layer 15a_3 and second light blocking layer 15b_3 is brought into contact with the long sides LS1 and LS2 and short sides SS1 and SS2, different amounts of ink I may be transferred.

However, in the case of the third light blocking layer 15c_3 disposed on the chamfer area CA_3, the ink I may be transferred only to the chamfer area CA_3 having a relatively narrow area. A more detailed description thereof is the same as described above.

As described above, in an exemplary embodiment of the cover glass printing pad, a light blocking ink may be printed on a partially inclined or rounded cover glass.

Further, a cover glass, on which a light blocking ink is easily printed on a partially inclined or rounded region of the cover glass, may be manufactured using the cover glass printing pad.

The effects of the invention are not limited by the foregoing, and other various effects are anticipated herein.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

In concluding the detailed description, those skilled in the art will appreciate that many variations and modifications may be made to the preferred embodiments without substantially departing from the principles of the invention. Therefore, the disclosed preferred embodiments of the invention are used in a generic and descriptive sense only and not for purposes of limitation.

What is claimed is:

1. A cover glass printing pad, comprising:
a jig portion;
a body portion in which a first surface contacts the jig portion and at least a part of a second surface is parallel to the first surface; and
a pad portion including an outer frame portion disposed on at least one side of the body portion and protruding in a first direction perpendicular to the second surface,
wherein at least one of an outer sidewall and an inner sidewall of the outer frame portion has an inclination of an acute angle with respect to the body portion, and
a distal end of the outer frame portion in the first direction has a predetermined central angle defined by inclined side surfaces.

2. The cover glass printing pad of claim 1,
wherein the body portion includes a first side extending in a second direction perpendicular to the first direction and a second side extending in a third direction perpendicular to the first direction and crossing the second direction.

3. The cover glass printing pad of claim 2,
wherein the outer frame portion include a first outer frame portion in which a region adjacent to the first side protrudes in the first direction.

4. The cover glass printing pad of claim 1,
wherein the first outer frame portion has a shape in which both sides surfaces are inclined.

5. The cover glass printing pad of claim 1,
wherein the outer frame portion further include a second outer frame portion in which a region adjacent to the second side protrudes in the first direction, and
a length of the first outer frame portion, measured in the second direction, is longer than a length of the second outer frame portion, measured in the third direction.

6. The cover glass printing pad of claim 5,
wherein the first outer frame portion and the second outer frame portion are unitary with each other.

* * * * *